United States Patent [19]
Itafuji et al.

[11] Patent Number: 6,109,303
[45] Date of Patent: Aug. 29, 2000

[54] PROCESS GAS SUPPLY UNIT

[75] Inventors: Hiroshi Itafuji; Toshiyasu Inagaki, both of Kasugai, Japan

[73] Assignee: CKD Corporation, Japan

[21] Appl. No.: 09/296,671

[22] Filed: Apr. 22, 1999

[30] Foreign Application Priority Data

Apr. 27, 1998 [JP] Japan .................................. 10-116631

[51] Int. Cl.⁷ .................................................. F16K 11/20
[52] U.S. Cl. .......................................... 137/884; 137/269
[58] Field of Search .................................. 137/269, 271, 137/884

[56] References Cited

U.S. PATENT DOCUMENTS

| | | | |
|---|---|---|---|
| 5,769,110 | 6/1998 | Ohmi et al. | 137/269 |
| 5,819,782 | 10/1998 | Itafuji | 137/240 |
| 5,836,355 | 11/1998 | Markulec et al. | 137/884 |
| 5,924,447 | 7/1999 | Evans et al. | 137/269 |
| 5,992,463 | 11/1999 | Redemann et al. | 137/884 |

FOREIGN PATENT DOCUMENTS 2568365 of 0000 Japan .

*Primary Examiner*—John Fox
*Attorney, Agent, or Firm*—Finnegan, Henderson, Farabow, Garrett & Dunner, L.L.P.

[57] ABSTRACT

A process gas supply unit includes an upper module block provided with flow passages, a passage block provided with flow passages connected with the flow passages of the upper module block, and a base block provided with a connection passage connected with the flow passages of the passage block. The upper module block is attached with a component used for the supply of process gas and is down mounted on the passage block by bolts. The base block is mounted underneath the adjacent passage blocks. Accordingly, a sequence of the components are communicated through the flow passages of the upper module block and the passage block, and the connection passage of the base block.

9 Claims, 28 Drawing Sheets

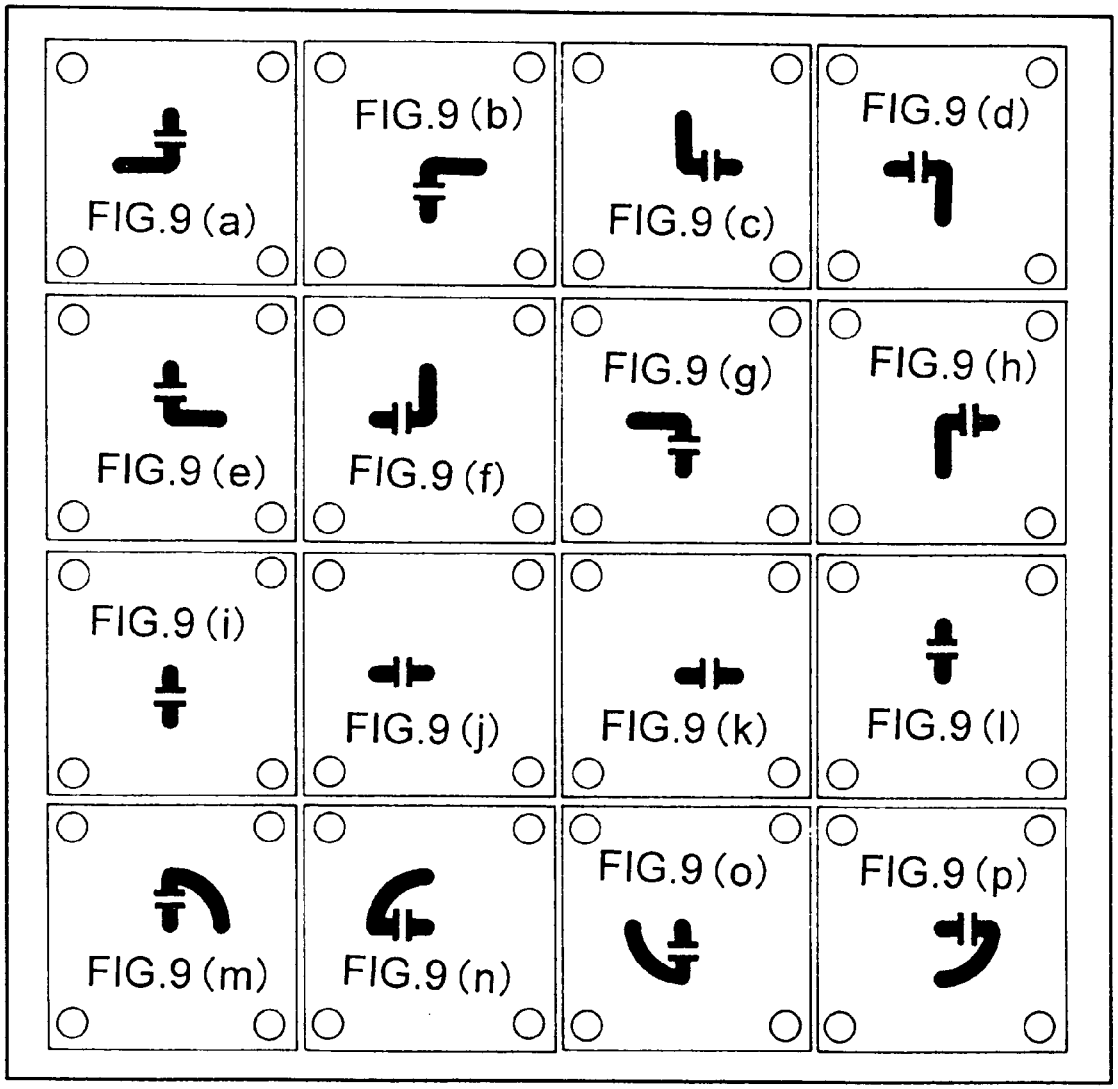

FIG.13 (a)
FIG.13 (b)
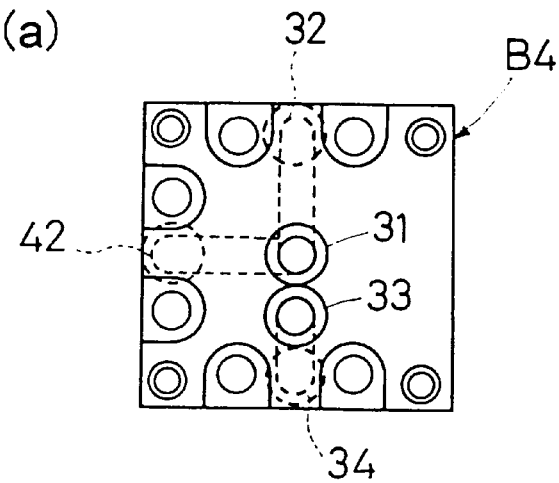
FIG.14 (a)
FIG.14 (b)
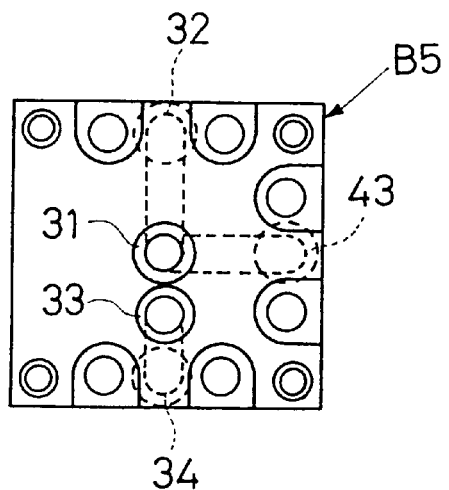
FIG.15 (a)
FIG.15 (b)
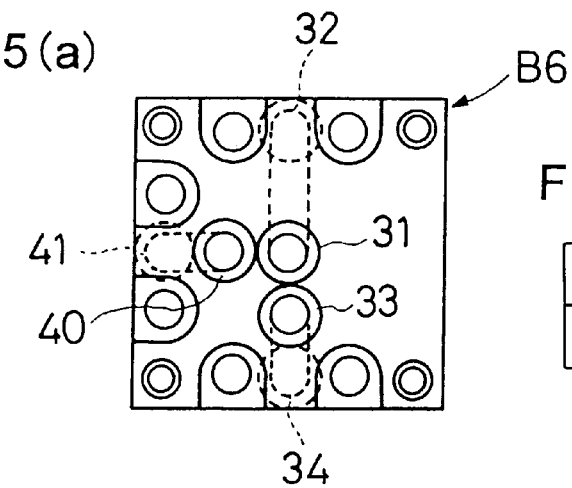

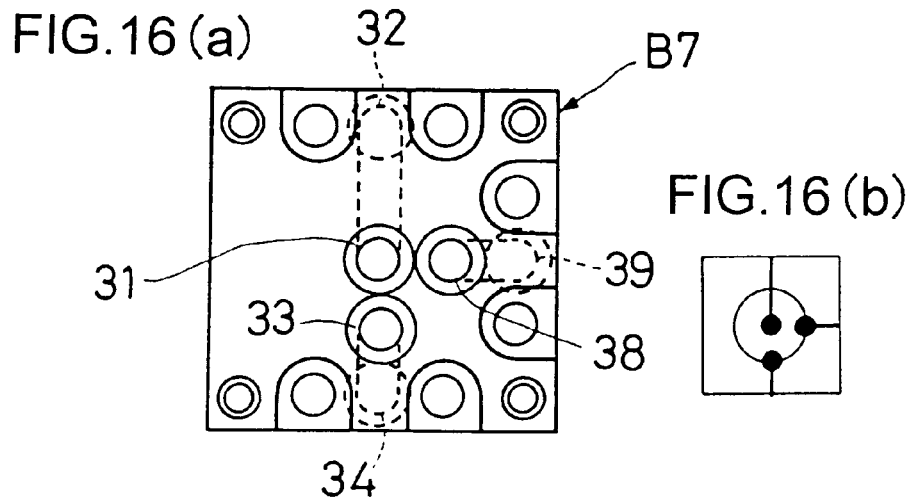
FIG.16(a)
FIG.16(b)
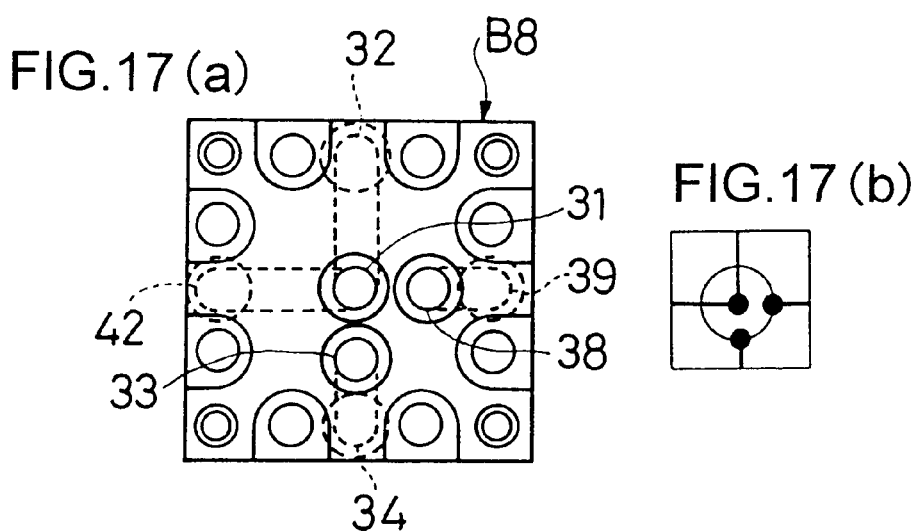
FIG.17(a)
FIG.17(b)
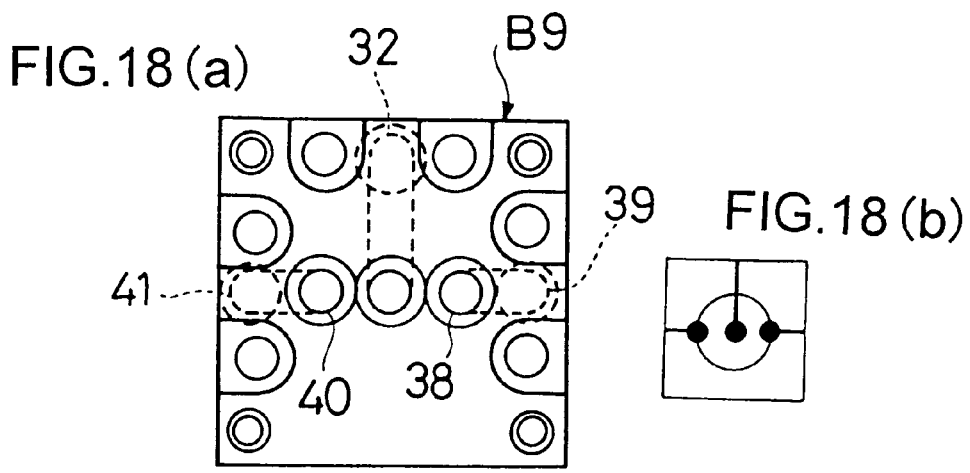
FIG.18(a)
FIG.18(b)

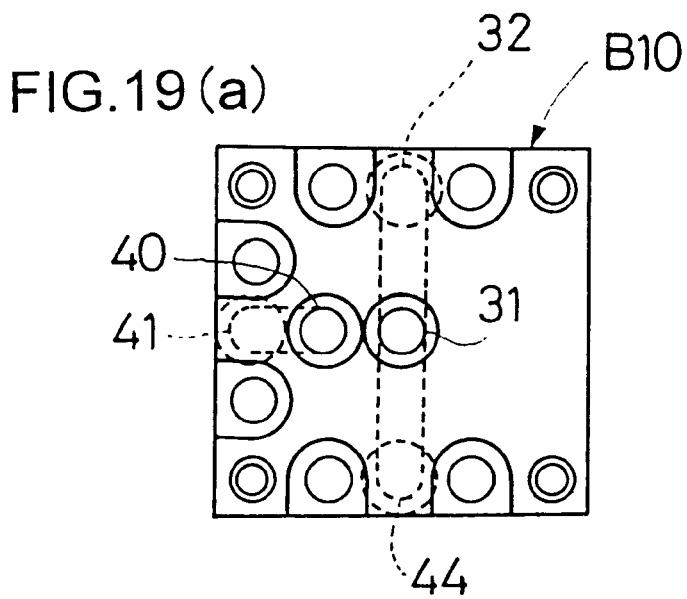
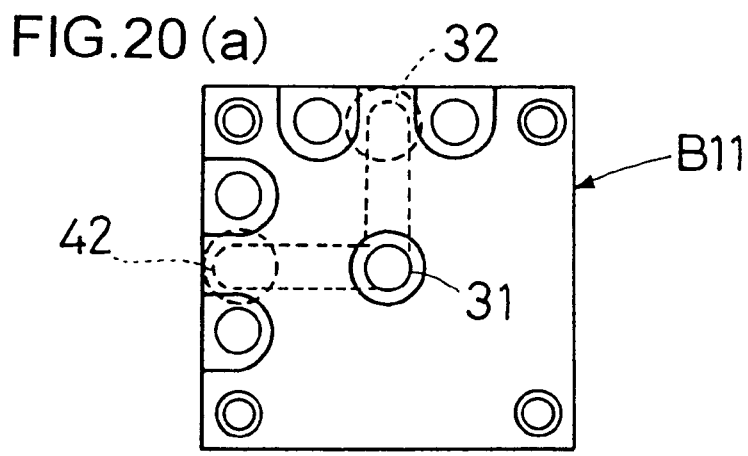
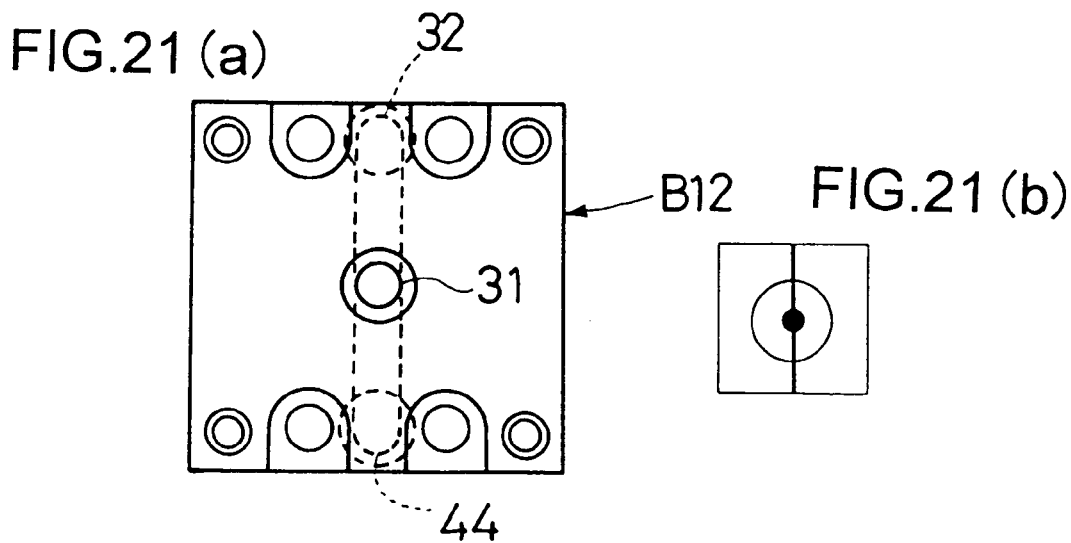

FIG.22 (a)
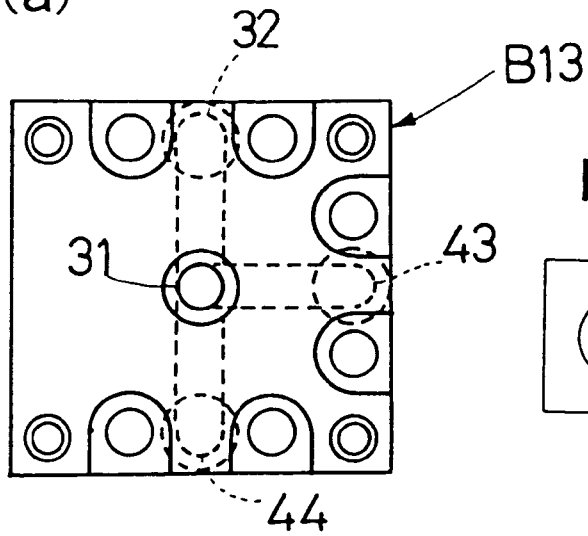
FIG.22 (b)
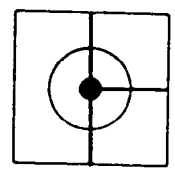
FIG.23 (a)
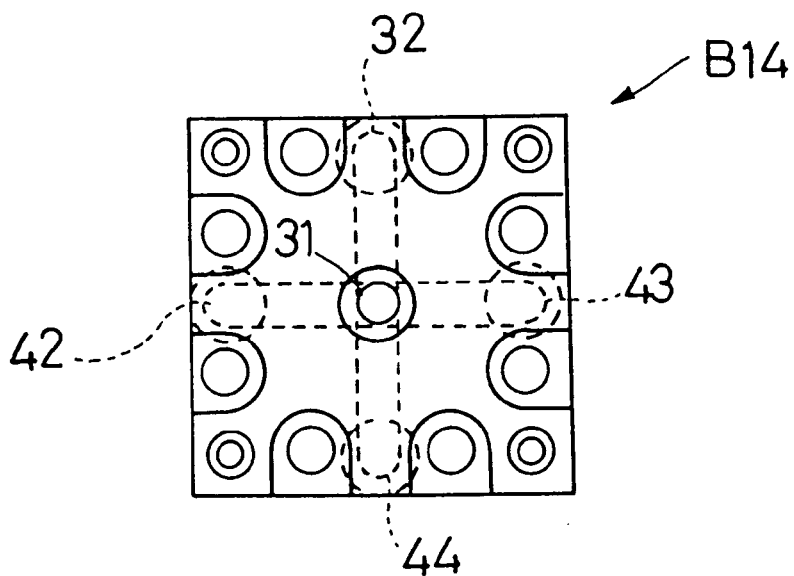
FIG.23 (b)

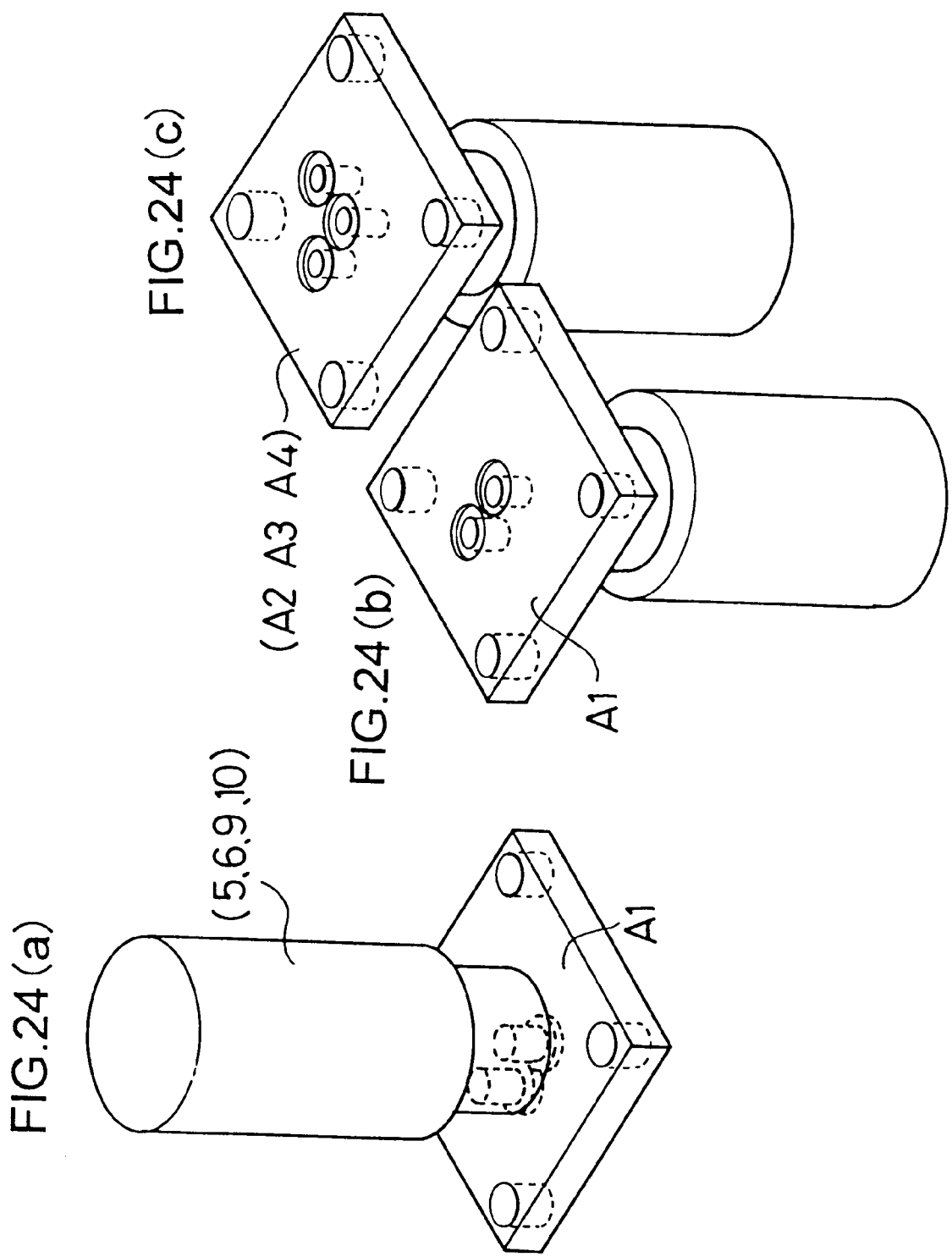

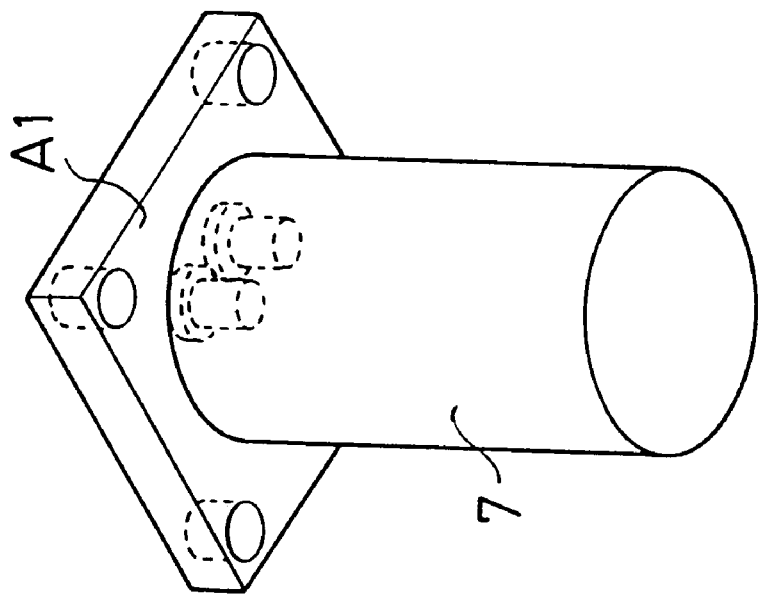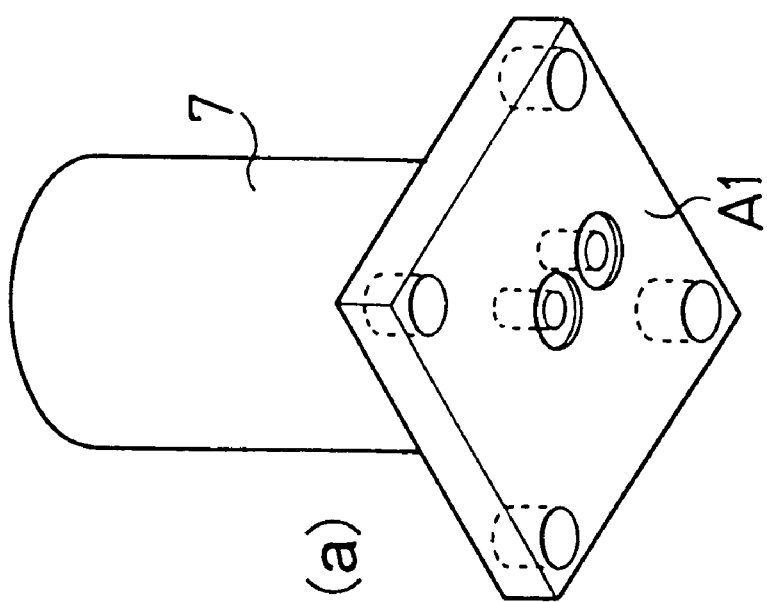

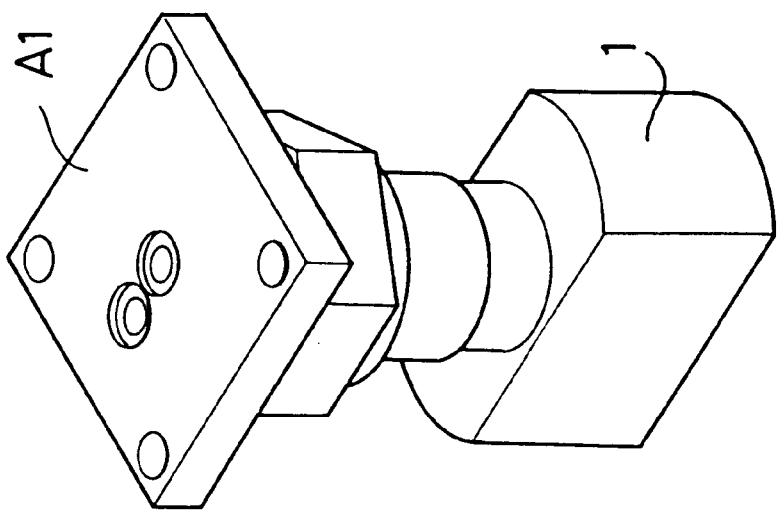
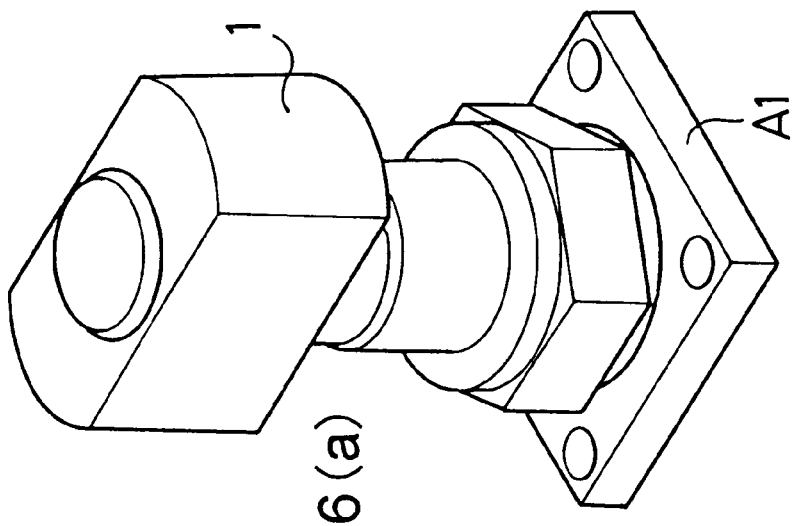

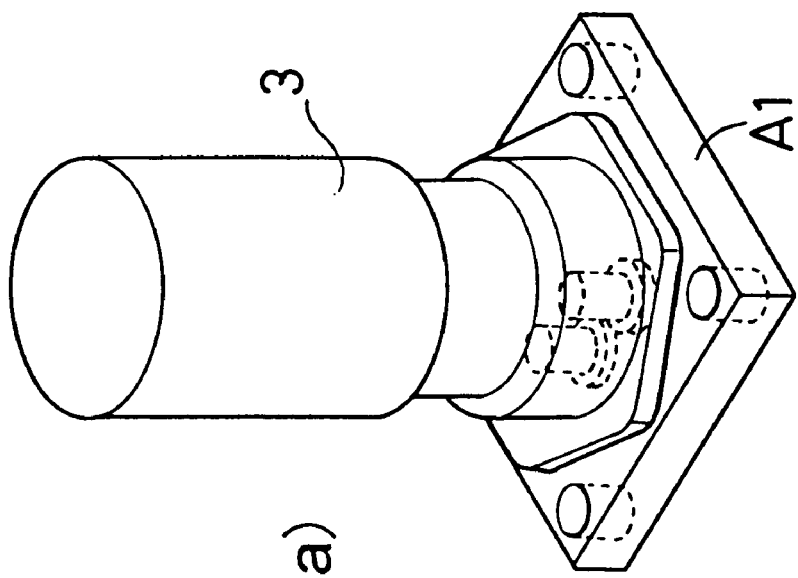
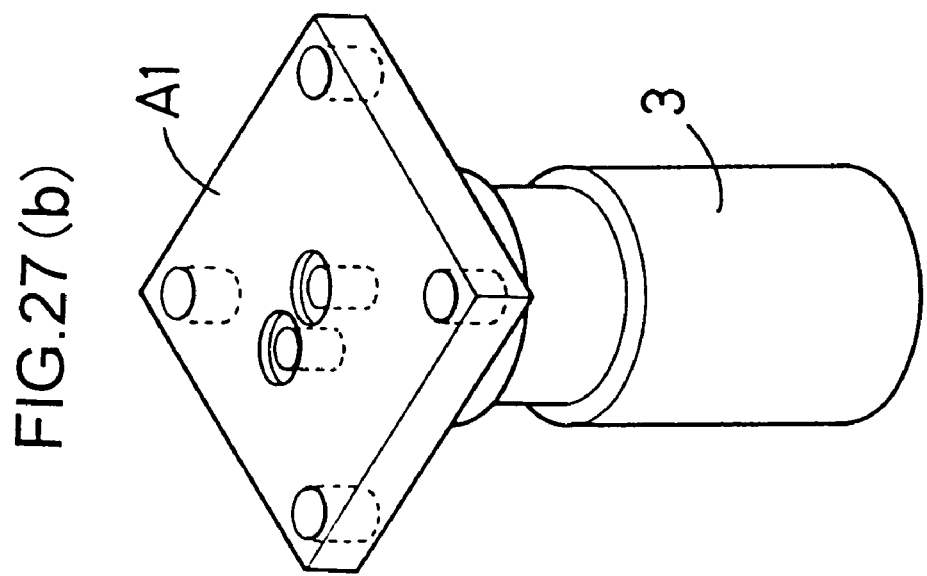
FIG. 27(a)
FIG. 27(b)

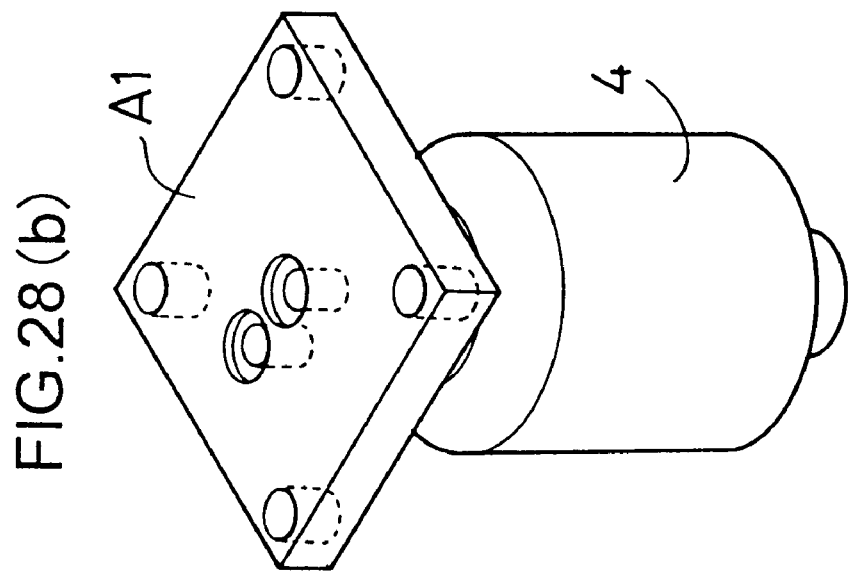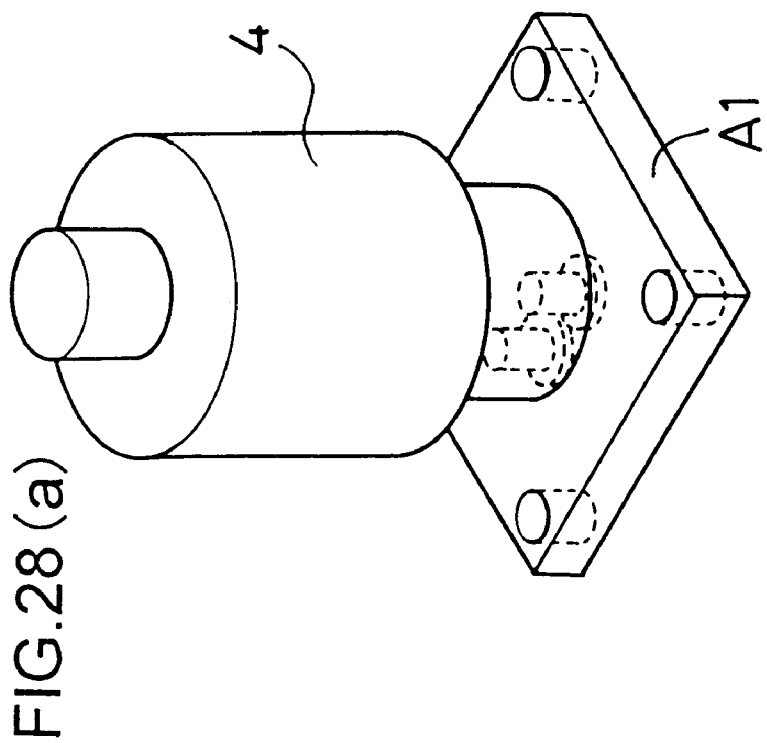

PROCESS GAS SUPPLY UNIT

BACKGROUND OF THE INVENTION

1. Field of the Invention

The present invention relates to a process gas supply unit for use in semiconductor manufacturing systems or lines, and more particularly to a flexible process gas supply unit which mainly includes a process gas supply valve, a purge valve, a check valve, a vacuum vale, a regulator, a filter, a pressure gage, etc.

2. Description of Related Art

For a semiconductor manufacturing line, there have been conventionally proposed process gas supply units for supplying process gas such as etching gas and the like. In the line, the method for batch-processing a plurality of wafers at once is being replaced by the method for processing the wafer on a one-by-one basis. Accordingly, a small-sized process gas supply unit is intensely required.

For downsizing the process gas supply unit, the applicants have proposed a process gas supply unit wherein a supply valve, a purge valve, and a vacuum valve are down mounted on module blocks which are manifolds by bolts, which is disclosed in Japanese patent publication No. 2,568,365.

FIG. 37 shows the structure of the process gas supply unit using the above-mentioned manifold and FIG. 38 shows a circuit diagram of the unit.

In the unit, as shown in FIG. 38, process gas flows into the left end and out the right end as indicated by arrows in the figure. A manual valve 1 is connected with a check valve 2 which is connected with a regulator 3. The regulator 3 is connected with an input valve 5. A pressure gage 4 is connected between the regulator 3 and the input valve 5. The input valve 5 is connected with an inlet port of the mass flow controller 8. The inlet port of the mass flow controller 8 is connected with a purge gas source through a purge valve 6 and a check valve 7.

An outlet port of the mass flow controller 8 is connected with an output valve 10 and vacuum pump which is a vacuum source through a vacuum valve 9. The output valve 10 is connected with a manual valve 11 of which an outlet port is connected with a vacuum chamber in the semiconductor manufacturing line.

Next, the embodied structure of the unit is explained with reference to FIG. 37. All of devices and components are mounted on a mounting panel D by bolts. Specifically, the manual valve 1 is fixed on the panel D with a bracket Y1. Both ends of the valve 1 are connected pipes 1a and 1b respectively and joints M. The pipe 1b and the joint M placed in the downstream side are connected with the check valve 2 that is connected with the regulator 3 through a joint M and a pipe 3a. The regulator 3 is fixed on the panel D with a bracket Y2 having the same structure as the bracket Y1.

With the right end of the regulator 3 are connected trifurcated pipes 5a and 4a through a joint M. The pressure gage 4 is connected with the trifurcated pipe 4a. The trifurcated pipe 5a is connected with a manifold Z1 through a joint M. On the manifold Z1 are attached the input valve 5 and the purge valve 6. A purge port of the manifold Z1 is connected with the check valve 7 through a pipe 6a and a joint M. The check valve 7 is connected with a purge gas source not illustrated through a joint M. The passage provided between the check vale 7 and the pipe 6a is formed in the interior of the manifold Z1.

The manifold Z1, to which a mass flow controller block N is joined, is fixed on the panel D with a plate X1. On the block N is mounted the mass flow controller 8. A right end of the mass flow controller block N is connected with a manifold Z2 having the same structure as the manifold Z1, on which the vacuum valve 9 and the output valve 10 are attached. The manifold Z2 is fixed on the panel D with a plate X2. The vacuum valve 9 is connected with a vacuum pump which is a vacuum source. The flow passage from the vacuum source is formed in the interior of the plate X2 having the same structure as the plate X1.

The manifold Z2 is connected with the manual valve 11 through a joint M and a pipe 11a. The manual valve 11 is fixed on the panel D with a bracket Y3 having the same structure as the bracket Y1. A right end of the manual valve 11 is connected with the vacuum chamber through a pipe 11b and a joint M.

The prior art process gas supply unit has the following disadvantages.

Adopting the manifold Z1 on which the input valve 5 and the purge valve 6 are integrally mounted from above by bolts, the unit could be downsized as compared with the unit wherein all devices are interconnected through pipes. However, such the downsized unit is yet insufficient from the viewpoint of a recent demand for a small-sized and integrated process gas supply unit. Concretely, the above unit has still much pipes and joints, resulting in the increase of space therefor.

On the other hand, the downsizing of the unit could be achieved by using manifolds and devices all made into blocks without using pipes and joints. However, since the components to be attached on the blocks are various such as a purge valve, a check valve, a vacuum valve, amass flow controller, a regulator, a filter, etc., the formation of passages suitable for each component in the blocks causes complication and the rise of cost.

In the case that the unit is used for standard lines for simply supplying process gas, the line can be linearly configured. If a purge line for purging the passage of the process gas unit is placed in the middle of the passage, however, the unit has to be arranged such that the purge line is directed to an end face of the block. This may result in completed flow passages in the blocks, which would become more non-general-purpose.

SUMMARY OF THE INVENTION

The present invention has been made in view of the above circumstances and has an object to overcome the above problems and to provide a small-sized and integrated process gas supply unit which can be configured for what kind of component by simply changing the combination of a plurality of types of blocks.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a process gas supply unit including an upper module block provided with flow passages, the block being attached with a component for supply of process gas, a passage constructing block provided with flow passages for providing communication between the components through the flow passages of the upper module block which is down mounted on the passage constructing block by bolts, and a base block provided with a connection passage for connecting the passages of the adjacent passage constructing blocks, the base block being mounted underneath the adjacent passage constructing blocks.

In the process gas supply unit, preferably, the upper module block comprises two or more types of which the flow passages differ in pattern, all of the types having a square bottom surface with identical dimensions, and the passage constructing block comprises two or more types of which the flow passages differ in patter, all of the types having a square top and bottom surfaces with identical dimensions to the bottom surface of the upper module block, and the upper module block attached with the component is combined with the passage constructing block to constitute the process gas supply unit.

In the process gas supply unit, preferably, the upper module block includes a first port formed in a center in the square bottom surface of the block, the first port being communicated with the component through a first passage of the flow passages, a second port formed in the square bottom surface at one place on one of four perpendicular lines from a center of the first port to four sides of the square surface, a third port formed in the square bottom surface at one place on a different perpendicular line from that the second port is formed on.

In the process gas supply unit, preferably, the third port is communicated with the first passage in an interior of the upper module block.

In the process gas supply unit, preferably, the passage constructing block include a first port formed in a center in the top surface, the first port being connected with the first port of the upper module block, a second port formed in the top surface at one place on one of four perpendicular lines from a center of the first port to four sides of the square top surface, the second port being connected with the second port of the upper module block, a third port formed in the top surface at one place on a different perpendicular line from that the second port is placed on, the third port being connected with the third port of the upper module block, and the first, second, and third ports being individually communicated with ports formed at predetermined locations in the bottom surface of the passage constructing block through the flow passages provided in the block.

In the process gas supply unit, preferably, the connection passage formed in the base block has a substantially V-shaped cross section and with both ends which open in a top surface of the base block.

In the process gas supply unit, preferably, the upper module block comprises two or more types of which the flow passages differ in pattern, all of the upper module block having a square bottom surface with identical dimensions, the passage constructing block is mounted underneath two or more upper module blocks and is provided with a connection passage which connects the flow passages of the adjacent upper module blocks.

In the process gas supply unit, preferably, the connection passage of the base block has a substantially V-shaped cross section, the base block has a substantially rectangular parallelepiped with a cutout portion at each corner, the base block is further provided with a pair of communication holes in a top surface, the communication holes being communicated through the connection passage, and a pair of mounting holes for mounting the base block on a mounting panel, the mounting holes being placed perpendicularly to the communication holes.

In the process gas supply unit, preferably, the base block is down mounted on mounting panel by bolts, the passage constructing block is down mounted on the base block by bolts, the upper module block attached thereon with the component is down mounted on the passage constructing block by bolts, the base block is provided with mounting holes for mounting the base block on the mounting panel and counter bores formed around the mounting holes, the passage constructing block is provided with mounting holes for mounting the passage constructing block on the base block and counter bores formed around the mounting holes, and heads of the bolts fixing the base block to the mounting panel and heads of the bolts fixing the passage constructing block to the base block are put in the counter bores respectively and hidden from view when the upper module block is mounted on the passage constructing block combined with the base block.

The effect and function of the process gas supply unit constructed as above is explained below.

In the process gas supply unit of the present invention, there are provided the upper module block on which a component used for supply of process gas, for example, any one of a manual valve, a regulator, a pressure gage, a filter, an input valve, a purge valve, an output valve, etc., the passage constructing block which has the flow passages for communicating the components when the upper module block is down mounted on the passage block by bolts, and the base block which has the connection passage for communicating the passages of the adjacent passage blocks when the base block is mounted underneath the passage blocks. Accordingly, all of the components are directly mounted on the module block and the base block without using pipes, so that the whole unit can be integrated and downsized. There is also no possibility that particles may generate in the pipes.

The upper module block is down mounted on the passage constructing block, this passage block is down mounted on the base block, and the base block is down mounted on the mounting panel, all by bolts from the same direction. All of the devices or components, and blocks can be detached from or attached to the mounting panel without detaching the panel even when the panel is close fixed on a machine or wall. In addition, the unification of the diameter and length of all of the bolts used in the unit can eliminate the need for assorting the bolts in particular in the detachment or attachment works, thus enhancing the working efficiency.

The upper module block includes two or more types of which the flow passages differ in pattern, and all of the types have the square bottom surface with identical dimensions. The passage constructing block includes two or more types of which the flow passages differ in pattern, and all of the types have the square top and bottom surfaces with identical dimensions to the bottom surface of the upper block. The upper block and the passage block are combined with an optional component to provide a desired process gas supply unit. Accordingly, such a simple combination of the standardized products for the upper block, the passage block, and the base block, which are standardized products, can materialize almost all the circuits and rapidly make a desired circuit. The standardized products are supplied after particles are sufficiently removed in advance, so that the generation of particles in the semiconductor manufacturing line can be reduced as compared with the prior art case that the devices or blocks have to be used in the line right after the flow passages are made by machine tools.

The upper module block has the first port formed in the center in the square bottom surface, the first port being communicated with the component through the first passage, the second port formed in the bottom surface at one place on one of four imaginary perpendicular lines from the center of the first port to all four sides of the square bottom surface, and the third port formed at one place on a different perpendicular line from that the second port is formed on. The degree of flexibility for configuring a desired circuit can be thus increased.

Due to the third port connected with the first passage in the interior of the upper module block, even if the passage constructing block is formed to have a connection passage with a V-shaped cross section to provide a communication passage between the adjacent components through the upper module blocks, the communication passage can be formed without changing the gradient of the V-shaped state and increasing the thickness of the passage block. In this case, the passage block and the base block can be made as a common standard.

The passage constructing block has the first port formed at the center of the top surface, which is connected with the first port of the upper module block, the second port formed at one place on one of four imaginary perpendicular lines from the center of the first port to all four sides of the square top surface, and the third port formed at one place on a different one of the perpendicular lines and connected with the third port of the upper module block. Accordingly, by the simple combination of the upper module block, the passage constructing block, and the base block, which are standardized products, almost all the circuits can be materialized. Those standardized products are supplied after particles are fully removed in advance. This can reduce the generation of particles in the semiconductor manufacturing line as compared with the prior art case where the blocks of which the passages are formed by machine tools have to be immediately used in the gas supply line.

The base block is formed with the connection passage with a substantially V-shaped cross section, so that by the simple combination of the upper module block, the passage constructing block, and the base block, which are standardized products, almost all the circuits can be materialized. Therefore, a desired circuit can be made rapidly. Those standardized products are supplied after particles are sufficiently removed in advance. This can reduce the generation of particles in the semiconductor manufacturing line as compared with the prior art case where the blocks of which the passages are formed by machine tools have to be immediately used in the gas supply line.

The base block is provided with a pair of communication holes formed on the top surface of the block and communicated with each other through the communication passage having a V-shaped cross section. The pair of mounting holes for attachment of the passage constructing block to the panel are formed perpendicularly to the pair of communication holes. In addition, the base block has a substantially rectangular parallelepiped shape with cutout portions at four ridge portions, or corners of the parallelepiped shape. Two of the base blocks can be therefore close combined, so that the base blocks can be assembled from the perpendicular direction to a series of the passage constructing blocks.

The base blocks are down mounted on the mounting panel by bolts. The passage constructing blocks are down mounted on the base blocks by bolts. The upper module blocks on which the components are fixed are down mounted on the passage constructing blocks by bolts. The base block has the counter bore around the mounting hole for attachment to the panel. The passage constructing block has the counter bore around the mounting hole for attachment to the base block. The heads of the bolts for fixing the base blocks to the mounting panel and the heads of the bolts for fixing the passage constructing blocks to the base blocks are placed in the counter bores such that the bolt heads are invisible from above when the module blocks are attached on the passage constructing block and the base block. This can prevent the error detachment of the passage constructing blocks and the base blocks. Since the bolt heads are thus hidden from view, an extra confirmation work to a worker is not needed, thereby enhancing the working efficiency for maintenance.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 9 is an explanatory view showing sixteen functional patterns of the upper module block;

FIG. 13 is a fourth type of the passage constructing block;

FIG. 14 is a fifth type of the passage constructing block;

FIG. 15 is a sixth type of the passage constructing block;

FIG. 16 is a seventh type of the passage constructing block;

FIG. 17 is an eighth type of the passage constructing block;

FIG. 18 is a ninth type of the passage constructing block;

FIG. 19 is a tenth type of the passage constructing block;

FIG. 20 is an eleventh type of the passage constructing block;

FIG. 21 is a twelfth type of the passage constructing block;

FIG. 22 is a thirteenth type of the passage constructing block;

FIG. 23 is a fourteenth type of the passage constructing block;

FIG. 24(a) is a perspective view of an air operation valve such as an input valve a purge valve an output valve and a vacuum valve mounted on the upper module block;

FIG. 24(b) is a perspective view of the valve and block of FIG. 24(a) in an inverted state;

FIG. 24(c) is a perspective view of the valve and block of FIG. 24(a) in an inverted state, the block is a different type from that in FIG. 24(b);

FIG. 25(a) is a perspective view of a filter mounted on the upper module block;

FIG. 25(b) is a perspective view of the filter and block of FIG. 25(a) in an inverted state;

FIG. 26(a) is a perspective view of the manual valve mounted on the upper module block;

FIG. 26(b) is a perspective view of the manual valve and block of FIG. 26(a) in an inverted state;

FIG. 27(a) is a perspective view of a regulator mounted on the upper module block;

FIG. 27(b) is a perspective view of the regulator and block of FIG. 27(a) in an inverted state;

FIG. 28(a) is a perspective view of a pressure gage mounted on the upper module block;

FIG. 28(b) is a perspective view of the pressure gage and block of FIG. 28(a) in an inverted state;

DETAILED DESCRIPTION OF THE PREFERRED EMBODIMENTS

A detailed description of a referred embodiment of a process gas supply unit embodying the present invention will now be given referring to the accompanying drawings.

Figure 1:
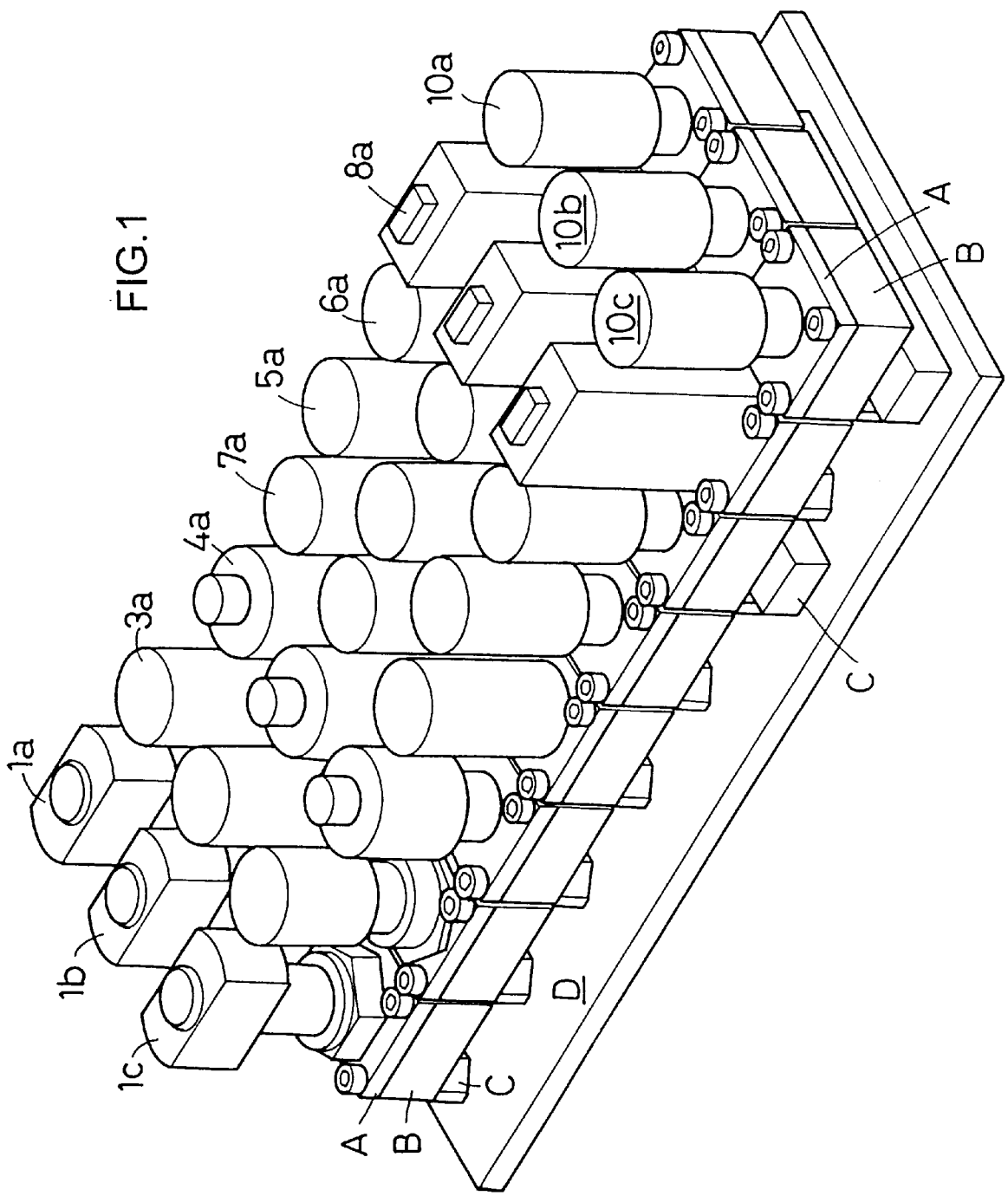
FIG. 1 is a perspective view of a process gas supply unit in an embodiment according to the present invention, using upper module blocks, passage constructing blocks, and base blocks.
Figure 2:
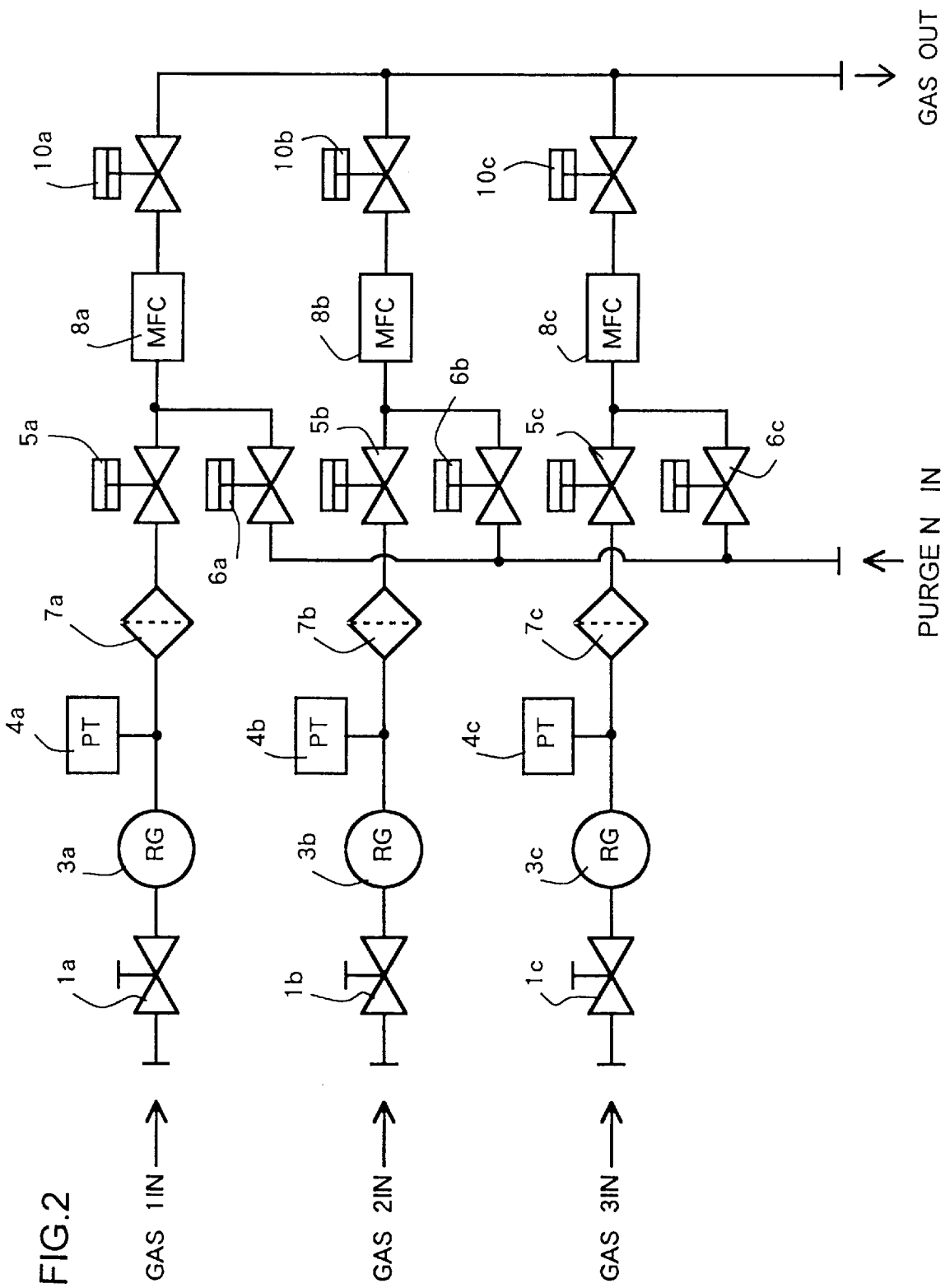
FIG. 2 is a circuit diagram of the unit shown in FIG. 1.

FIG. 1 is a schematic vie of the process gas supply unit in the embodiment according to the present invention. FIG. 2 is a circuit diagram of the unit.

As shown in FIG. 1 of which the detail will be mentioned later. the fundamental structure of the process gas supply unit comprises upper module blocks A to which components E such as a manual valve 1, a regulator 3, a pressure gage 4, an input valve 5, a mass flow controller 8, an output valve 10, a filter 7, a purge valve 6, etc. are attached. passage constructing blocks B mounted on the module blocks A, base blocks C mounted on the passage constructing blocks B, and a mounting panel D on which the base blocks C are fixed.

At first, explanation is made on the upper module block (referred to as 'upper block' hereinafter) A, the passage constructing block (referred to as 'passage block' hereinafter) B, and the base block C, respectively, which are elements constituting the whole structure of the process gas supply unit.

The upper block A is first described.

The components are conventionally attached on module blocks which are fixed on passage blocks by bolts. The conventional module blocks, however, have fixed inlet ports and outlet ports. All passages have been therefore changed by the passage blocks.

Figure 5A:
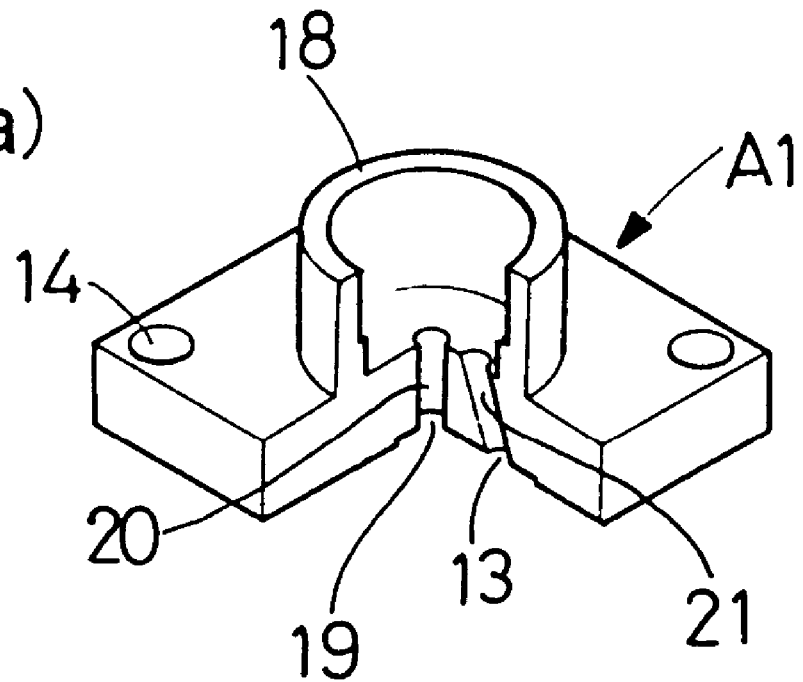
FIG. 5 is a first type of the upper module block.
Figure 5B:
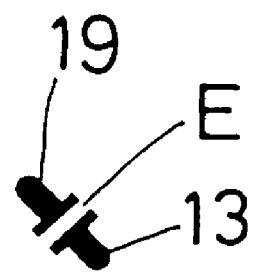
Figure 6:
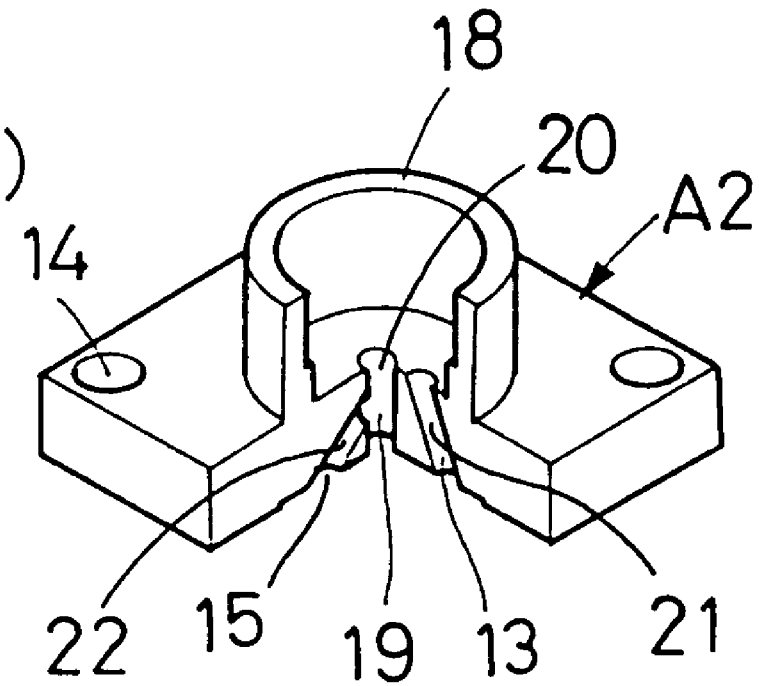
FIG. 6 is a second type of the upper module block.
Figure 6:
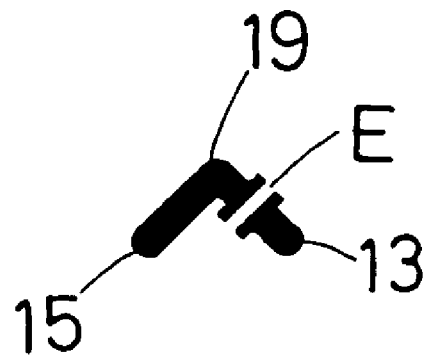
Figure 7:
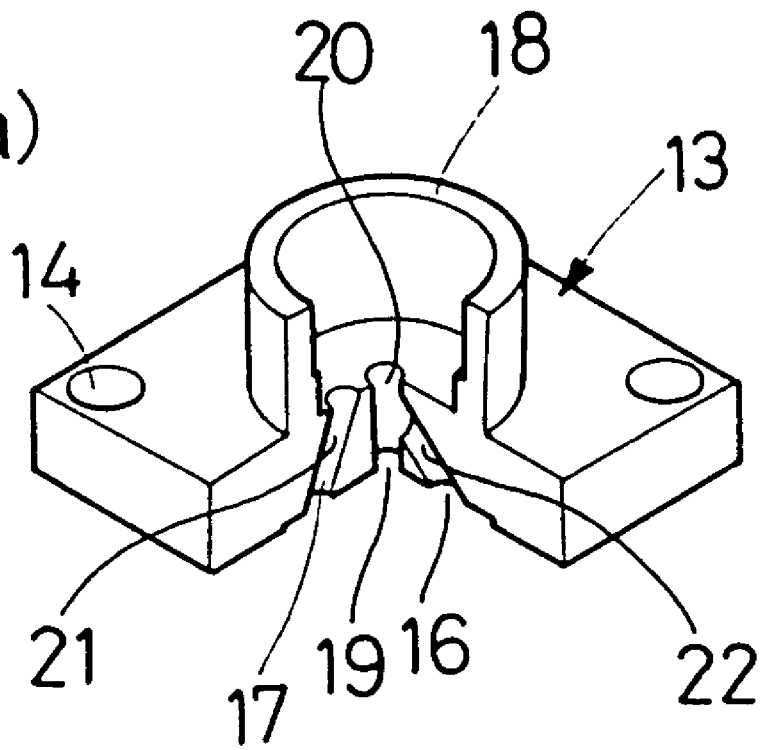
FIG. 7 is a third type of the upper module block.
Figure 7:
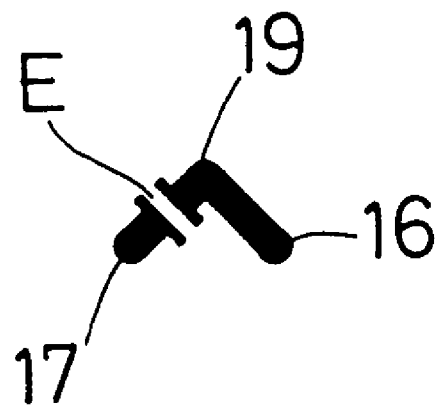

To the contrary, the upper block A in the embodiment, which is a feature of the present invention, includes four types as shown in FIGS. 5 to 8. FIG. 5 is a first type A1 of the upper block A; FIG. 6, a second type A2; FIG. 7, a third type A3; and FIG. 8, a fourth type A4.

The upper block A, in all of the four types A1 to A4 in the embodiment, is formed to have a square bottom surface of 39 mm width and 39 mm length. A center port 19 is provided in the center in the bottom surface. a cylindrical bracket 18 for connection to the component E to be attached thereto. The component E is fixed to the bracket 18 by screw-fastening and the like.

In the upper block A there are provided bolt holes 14 around the corners of the block, for fixing the block A to the passage block B.

Here, the differences between the four types A1 to A4 are described in the following.

The first type A1 has, as shown in FIG. 5(a), in the bottom surface, a center port 19 which is a first port formed in the center and a right port 13 which is a second port formed in the right side of the center port 19 in the figure and at a place on a perpendicular line from the center of the center port 19 to a side of the square bottom surface of the block. The center port 19 is to be communicated with the component E through a first passage 20, while the right port 13 is to be communicated with the component E through an independent passage 21 of the first passage 20. The functional diagram is shown in FIG. 5(b), where the component e is connected between the center port 19 and the right port 13.

The second type A2 has, as shown in FIG. 6(a), in the bottom surf ace, a center port 19 which is a first port formed in the center, a right port 13 which is a second port formed in the right side of the center port 19 in the figure and at a place on a perpendicular line from the center of the center port 19 to a side of the square bottom surface of the block, and a left port 15 which is a third port formed in the left side in the figure and in a direction at right angles to the right port 13 about the center port 19. the center port 19 is to be communicated with the component E through a first passage 20. The right port 13 is to be communicated with the component E through an independent passage 21 of the first passage 20. The left port 15 is communicated with the first passage 20 in the middle thereof in the interior of the upper block A2 through a branch passage 22 of the first passage 20. The functional diagram is shown in FIG. 6(b), where the center port 19 is in communication with the left port 15 and is connected to the right port 13 through the component E.

The third type A3 has, as shown in FIG. 7(a), a center port 19 in the center and a left port 17 which is a second port formed in the left side of the center port 19 and at one place on a perpendicular line from the center of the center port 19 to a side of the square bottom surface of the block A3, and a right port 16 which is a third port formed in the right side of the center port 19 and in a direction at right angles to the left port 17 about the center port 19. the center port 19 is to be communicated with the component E through a first passage 20. The left port 17 is to be communicated with the component E through an independent passage 21 separately from the first passage 20. The right port 16 is connected with the first passage 20 in the middle thereof in the interior of upper block A3 through a branch passage 22 of the first passage 20. The functional diagram is shown in FIG. 7(b), where the center port 19 is in communication with the right port 16 through the branch passage 22 and is connected with the left port 17 through the component E.

It is to be noted that the difference between the second type A2 and the third type A3 is only to replace the locations of the second port and the third port.

Figure 8A:
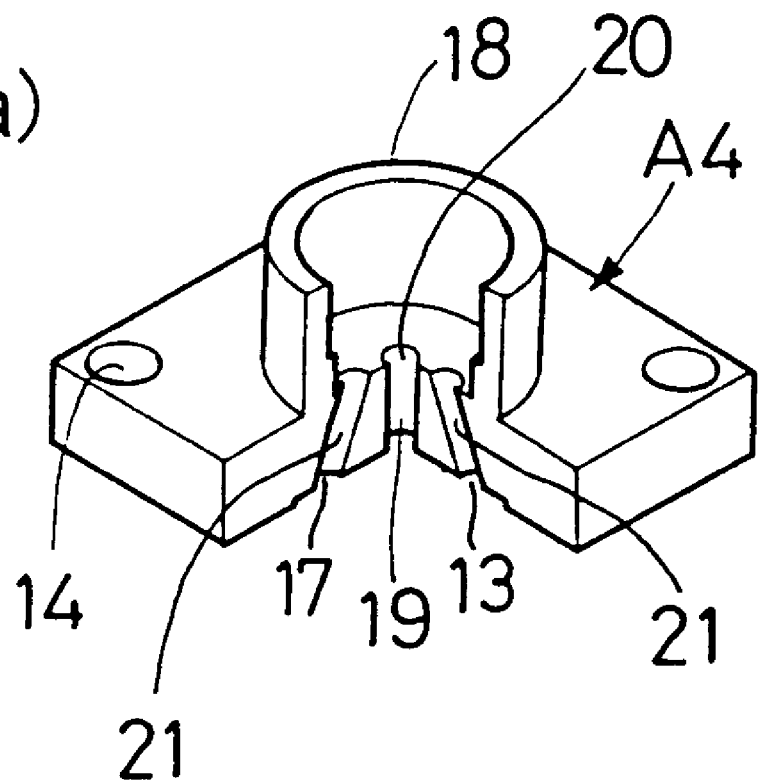
FIG. 8 is a fourth type of the upper module block.
Figure 8B:
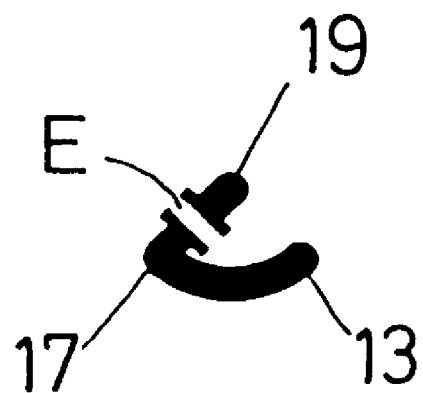

The fourth type A4 has, as shown in FIG. 8(a), in the bottom surface, a center port 19 in the center, a right port 13 which is a second port formed in the right side of the center port 19 in the figure and at one place on a perpendicular line from the center of the center port 19 to a side of the square bottom surface, and a left port 17 formed in the left side of the center port 19 in the figure and in a direction at right-angles to the right port 13 about the center port 19. The functional diagram is shown in FIG. 8(b), where the center port 19 is in communication with the right and left ports 13 and 17 through two slanting passages 21 and the component E.

The structural type of the upper block A in the present embodiment are only the above mentioned four patterns, while the upper block A attached with the component E provides sixteen patterns for the functional type in relation to the attachment direction of the component E. All of the patterns are shown in FIG. 9.

In FIG. 9, (a) to (d) show the third type A3 of which the direction differs; (e) to (h) show the second type A2 of which the direction differs; (i) to (l) show the first type A1 of which the direction differs; and (m) to (p) show the fourth type A4 of which the direction differs.

The types of the components E to be attached to the upper block A is described below.

FIG. 24 shows the upper block A mounting thereon an air operation valve used for the input valve 5, the purge valve 6, the output valve 10, and the vacuum valve 9. FIG. 24(a) is a perspective view seen from above, FIGS. 24(b) and (c) are perspective views of the upper block a mounting the valve in an inverted state after detachment from the unit. It is to be noted that FIG. 24(b) shows the first type A1, while FIG. 24(c) shows one of the second, third, and fourth types A2, A3, and A4.

FIG. 25 shows the upper block A mounting thereon the filter 7; (a) is a perspective view seen from above and (b) is a perspective view of the block A and the filter 7 inverted after detachment from the unit.

FIG. 26 shows the upper block A mounting thereon the manual valve 1; (a) is a perspective view seen from above and (b) is a perspective view of the block A and the valve 1 inverted after detachment from the unit.

FIG. 27 shows the upper block A mounting thereon the regulator 3; (a) is a perspective view seen from above and (b) is a perspective view of the block A and the regulator 3 in an inverted state after detached from the unit.

FIG. 28 shows the upper block A mounting thereon the pressure gage 4; (a) is a perspective view seen from above and (b) is a perspective view of the block A and the pressure gage 4 in an inverted state after detached from the unit.

Figure 29:
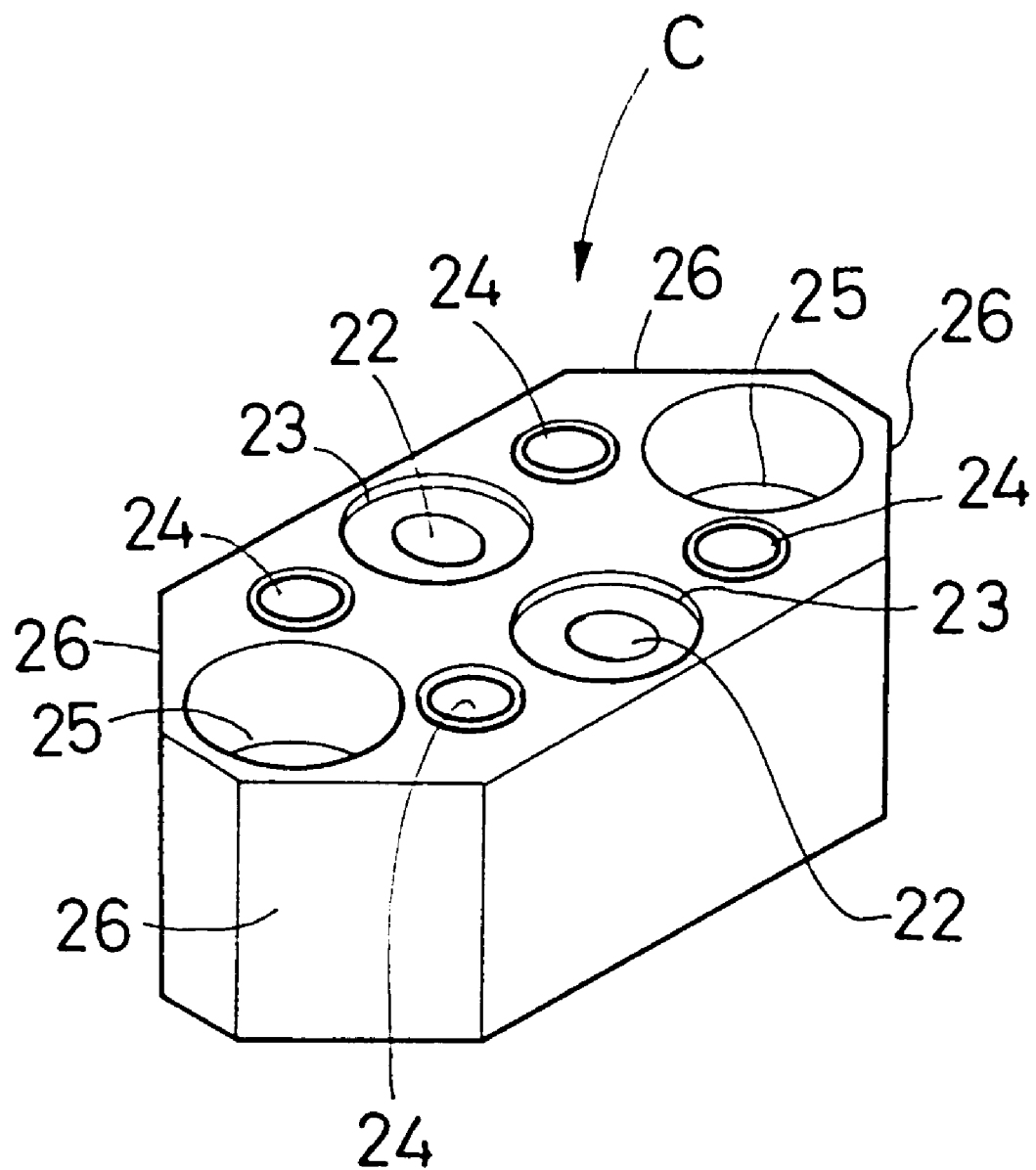
FIG. 29 is a perspective view of the base block in the embodiment.

Next, the base block C is described. FIG. 29 is a perspective view of the base block C. FIGS. 30(a) and 30(b) are plane view and a cross sectional view of the base block C, respectively.

On the upper face of the block C are formed a pair of communication holes 22 which are communicated with each other through a communication passage 27 having a V-shaped cross section as shown in FIG. 30(b). A round the communication hole 22 is formed a counter bore 23 in which a metal gasket for a sealing member is to be put. A pair of bolt holes 24 each having a female screw therein are formed in the both sides (i.e., in the upper and lower sides in FIG. 30(a)) of each the communication holes 22. A pair of mounting holes 25 for attachment of the base block C onto the mounting panel D are formed around both ends in a longitudinal direction of the almost perpendicular parallelepiped block. Around the mounting hole 25 is formed a counter bore 25a.

The base block C has also cutout portions 26 formed at four corners of the block, in both sides of each of the mounting holes 25. These cutout portions 26 are formed at the size such that the corners of the blocks do not interfere to each other even if the blocks are close placed as will be mentioned later.

The passage block B is described below. Fourteen types in the shape and symbol of the block b is shown in FIGS. 10 to 24.

As shown in FIG. 1, the passage block B is formed in a rectangular parallelepiped shape having top and bottom square surfaces of 39 mm width and 39 mm length, which is the same in dimensions as the bottom surface of the upper block A mounted on the top surface of the passage block B.

Figure 10A:
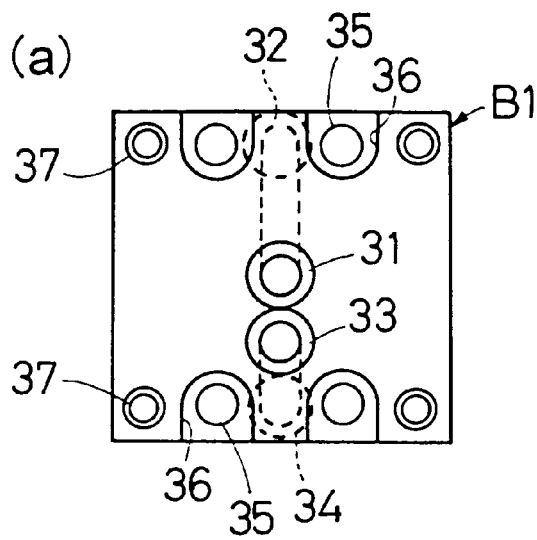
FIG. 10 is a first type of the passage constructing block.

FIG. 10 shows a first type B1 of the passage block B. A center port 31 for a first port is formed in the center in the top surface of the passage block B1. This center port 31 is communicated with a port 32 formed around an upper end in the bottom surface through a slanting passage. In the top surface is formed a lower side port 33 for a second port formed at one place on a perpendicular line from the center of the center port 31 to a lower side of the square upper surface. This lower side port 33 is communicated with a port 34 formed in the bottom surface of the passage block B1 around a lower end in the figure through a slanting passage.

A pair of mounting holes 35 are formed in both sides of each of the ports 33 and 34 formed in the bottom surface. Around the mounting hole 35 in the top surface side is formed a counter bore 36. The passage block B is mounted on the base block C by bolts through the mounting holes 35.

Bolt holds 37, each of which has a female screw, are also formed at four corners of the block B. the upper block A is screw-fastened onto the passage block B by bolts through the bolt holes 37.

Figure 10B:
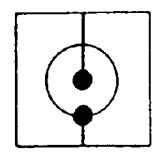
Figure 11A:
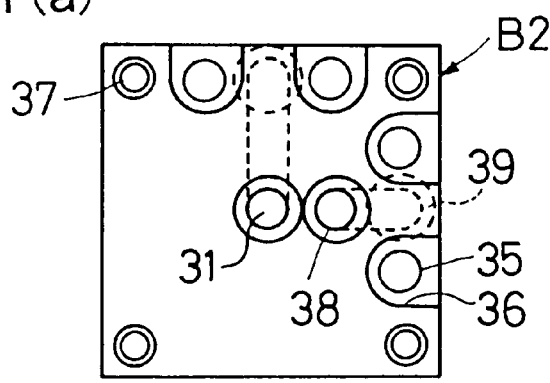
FIG. 11 is a second type of the passage constructing block.
Figure 11B:
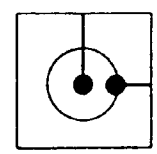

The structure of the blocks shown in FIG. 11 and the following figures are substantially similar to that of the first type B1 of FIG. 10. Only differences are described below.

FIG. 11 shows a second type B2 of the passage block B which has a right port 38 for a second port formed at one place on a perpendicular line from the center of the center port 31 to a right side of the square top surface of the block B2. The right port 38 is communicated with a port 39 formed in the bottom surface of the block B2 around a right end in the figure through a slanting passage.

Figure 12A:
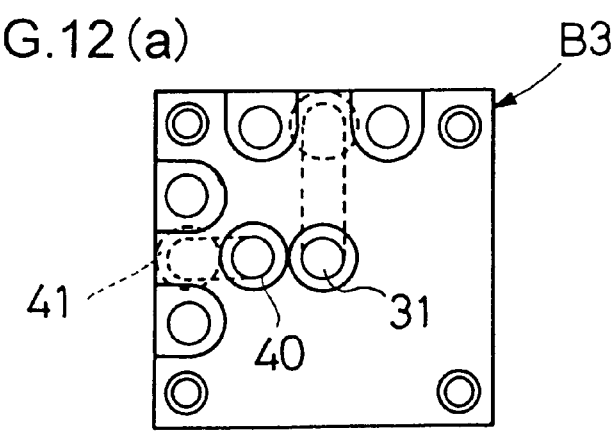
FIG. 12 is a third type of the passage constructing block.
Figure 12B:
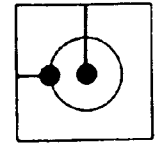

FIG. 12 shows a third type B3 which has a left port 40 for a second port at one place on a perpendicular line from the center of center port 31 to a left side of the square surface. The left port 40 is communicated with a port 41 formed in the bottom surface around a left end in the figure through a slanting passage.

FIG. 13 shows a fourth type B4 which has a lower side port 3 for a second port at one place on a perpendicular line from the center of the center port 31 to a lower side. The port 33 is communicated with a port 34 formed in the bottom surface around a lower end in the figure through a slanting passage. These structures of the fourth type B4 are similar to that of the first type B1, while the fourth type B4 differs from the first type B1 in that the center port 31 is also communicated with a port 42 formed in the bottom surface around a left end in the figure through another slanting passage. That is to say, the center port 31 is in communication with two ports 32 and 42 formed in the bottom surface of the block B4.

FIG. 14 shows a fifth type B5 which differs from the fourth type B4 in the location of two ports formed in the bottom surface in communication with the center port 31. The center port 31 of the fifth type is communicated with two ports 34 and 43.

FIG. 15 shows a sixth type B6 which has a center port 31 for a first port formed in the center in the top surface and communicated with a port 32 formed in the bottom surface around an upper end in the figure through a slanting passage, a lower side port 33 for a second port which is communicated with a port 34 through a slanting passage, and a left port 40 which is communicated with a port 41 formed in the bottom surface around a left end in the figure through a slanting passage.

FIG. 16 shows a seventh type B7 which has a center port 31 which is formed in the center in the top surface and communicated with a port 32 formed in the bottom surface around an upper end in the figure through a slanting passage, a lower side port 33 or a second outlet port which is communicated with a port 34 formed round a lower end in the bottom surface through a slanting passage, nd a right port 38 which is communicated with a port 39 formed in the bottom surface around a right end in the figure through a slanting passage.

FIG. 17 shows an eighth type B8 which has a center port 31 which is communicated with a port 32 formed in the bottom surface around an upper end in the figure and a port 34 formed around a lower end, a lower side port 33 which is communicated with a port 34 formed in the bottom surface around a lower end in the figure through a slanting passage, and a right port 38 which is communicated with a port 39 formed in the bottom surface around a right end in the figure through a slanting passage.

FIG. 18 shows a ninth type B9 which has a center port 31 which is communicated with a port 32 formed in the bottom surface around an upper end, a right port 38 which is a communicated with a port 39 formed around a right end, and a left port 40 which is communicated with a port 41 formed around a left end.

FIG. 19 shows a tenth type B10 which has a center port 31 which is formed in the center in the top surface and communicated with an upper port 32 and a lower port 44 formed in the bottom surface through slanting passages, and a left port 40 communicated with a port 41 formed in the bottom surface around a left end in the figure.

FIG. 20 shows an eleventh type B11 which has a center port 31 which is formed in the center in the top surface and communicated with two ports formed in the bottom surface through respective slanting passages, namely, a port 42 formed around a left end in the figure and a port 32 around an upper end.

FIG. 21 shows a twelfth type B12 which has a center port 31 which is formed in the center in the top surface and communicated with two port formed in the bottom surface through respective slanting passages, namely, a port 32 formed around an upper end in the figure and a port 44 formed around a lower end.

FIG. 22 shows a thirteenth type B13 which has a center port 31 which is formed in the center in the top surface and communicated with three ports formed in the bottom surface through respective slanting passages, namely, a port 32 formed around an upper end in the figure, a port 43 formed around a right end, and a port 44 formed around a lower end.

FIG. 23 shows a fourteenth type B14 which has a center port 31 which is formed in the center in the top surface and communicated with four ports formed in the bottom surface through respective slanting passages, namely, a port 32 formed around an upper end in the figure, a port 42 around a left end, a port 43 around right end, and a port 44 around a lower end.

The center port 31 shown in FIGS. 20, 21, and 22 are normally attached with a stopper such that the blocks B12 to B14 are used for providing simple flow passages, but they may be attached with an upper block A as required.

Next, explanation is made on the action of the upper block A, the passage block B, and the base block C constructed as above, which are main building blocks for the process gas supply unit in the embodiment. An example of the assembled unit is shown in FIG. 1 and its circuit diagram is shown in FIG. 2.

As shown in FIG. 2, the process gas supply unit in the embodiment is composed of three process gas lines a, b, and c. The components E constituting each line are identical. The components E for the typical line "a" are therefore explained below. In the line, a process gas supply source is connected with an inlet port of a manual valve 1a of which an outlet port is connected with an inlet port of a regulator 3. An outlet port of the regulator 3 is connected with an inlet port of a filter 7a. A pressure gage 4a is connected with a passage connecting the regulator 3 to the filter 7a.

An outlet port of the filter 7a is connected to an inlet port of an input v 5a of which an outlet port is connected with an inlet port of a mass flow controller 8a. A purge valve 6a is connected with a passage connecting the input valve 5a to the mass flow controller 8a. An inlet port of the purge valve 6a joins other purge valves 6b and 6c and is connected with a nitrogen gas supply source for purge gas.

An outlet port of the mass flow controller 8 is connected with an inlet port of an output valve 10a of which an outlet port joins other output valves 10b and 10c and is connected with a vacuum chamber.

As shown in FIG. 1, the base blocks C are mounted on the mounting panel D, the passage blocks B are mounted on the base blocks C, and the upper blocks A to which the above components E are attached are mounted on the passage blocks B.

Figure 3:
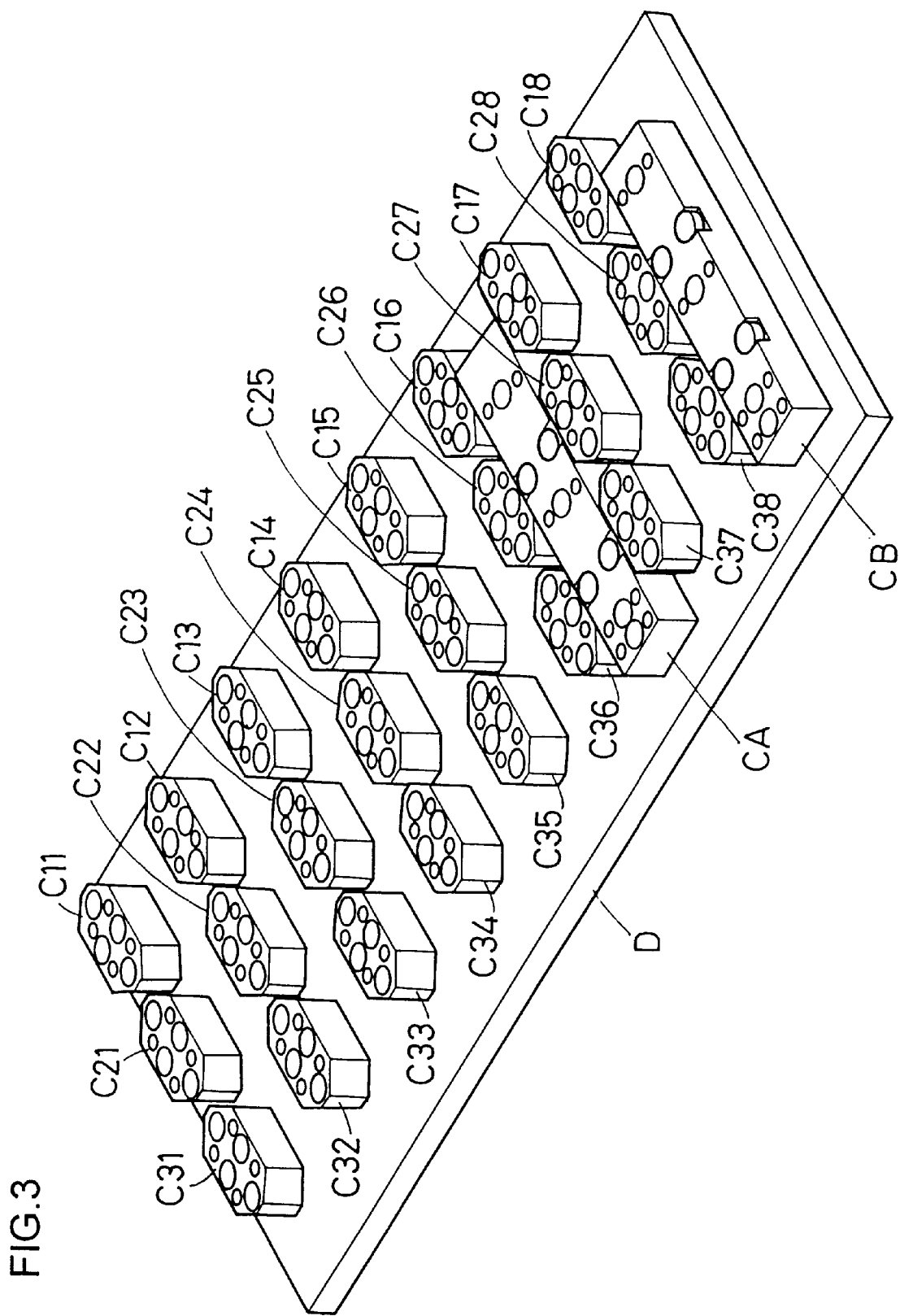
FIG. 3 is a perspective view of a mounting panel and the base blocks mounted thereon, constructing the unit of FIG. 1.
Figure 4:
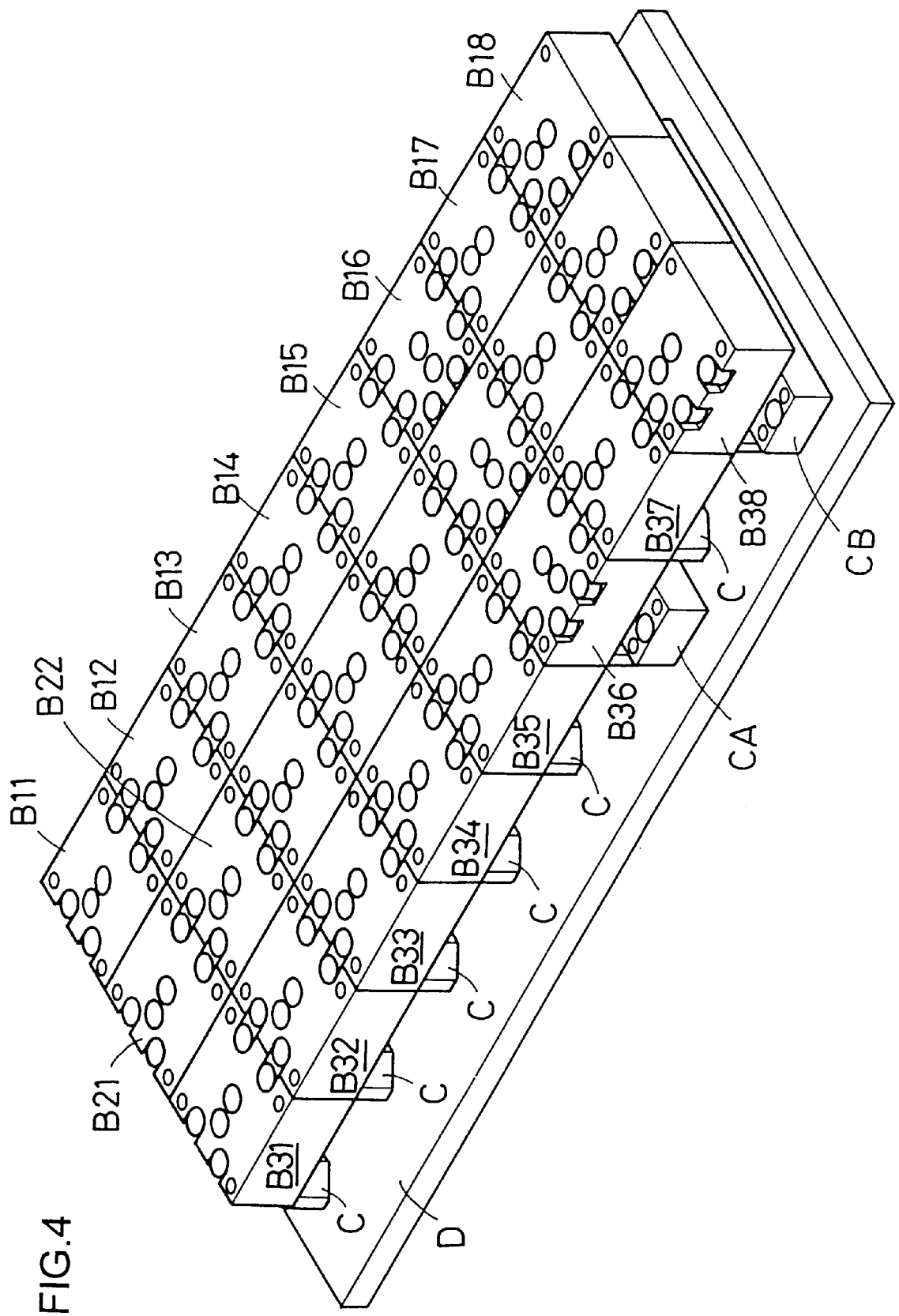
FIG. 4 is a perspective view of the mounting panel, the base blocks and the passage constructing blocks mounted down on the panel, constructing the unit of FIG. 1.
Figure 35:
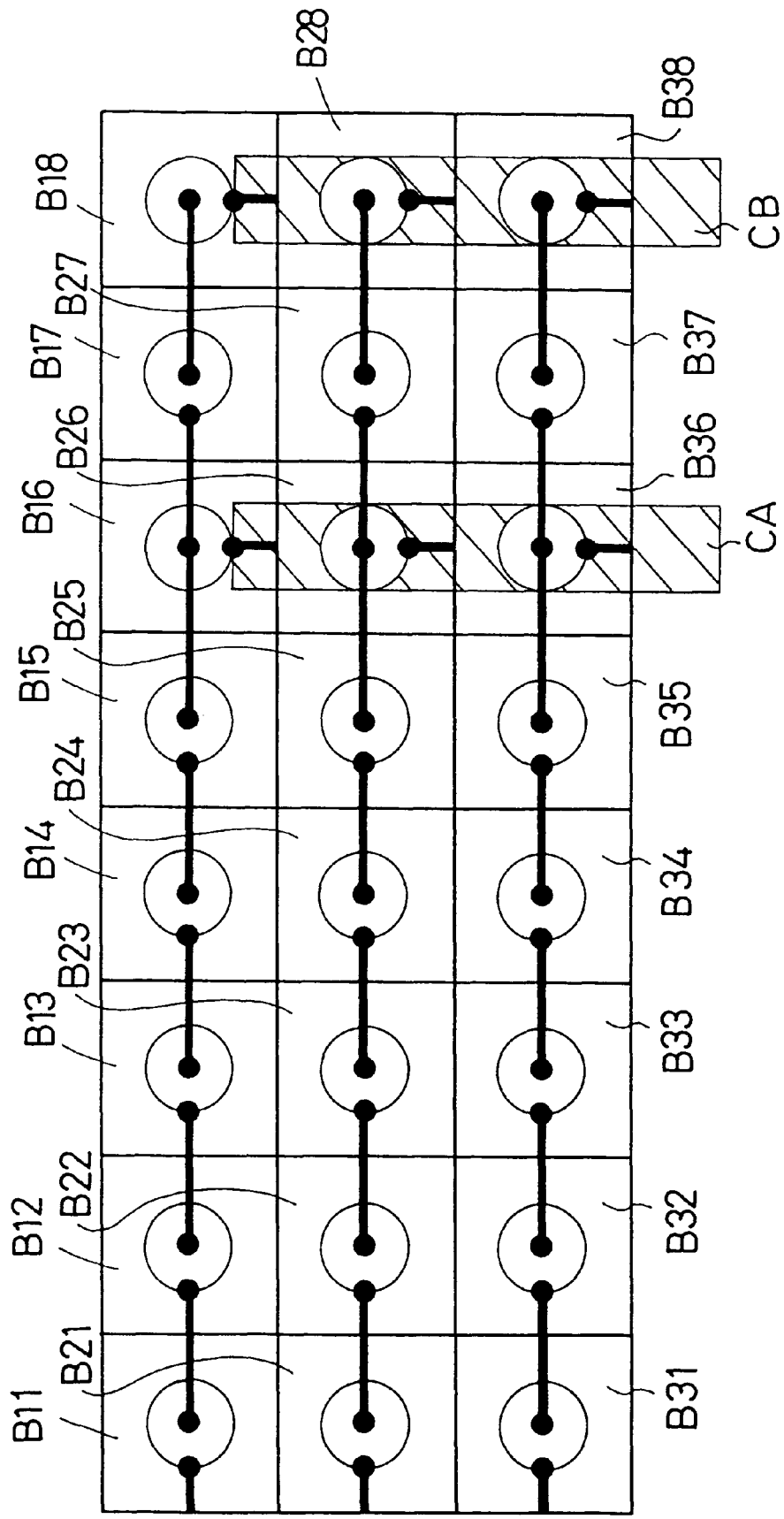
FIG. 35 is a schematic diagram showing the passage constructing blocks shown in FIG. 4.

FIG. 3 shows a state where the base blocks C are mounted on the mounting panel D. FIG. 4 shows a state where the base blocks C and the passage blocks B are mounted on the mounting panel D. FIG. 35 shows the combination of the passage blocks B by symbols of FIGS. 10 to 23.

The combination of the passage blocks B is explained below, referring to FIG. 35. Note that since the three process gas lines a, b, and c have the same structure, only the typical line "a" is described below.

In the line, sequenced from the left are a passage block B11 for an upper block A11 attached with the manual valve 1a, a block B12 for an upper block A12 attached with the regulator 3a, a block B13 for an upper block A13 attached with the pressure gage 4a, a block B14 for an upper block A14 attached with the filter 7a, a block B15 for an upper block A15 attached with the input valve 5a, a block B16 for an upper block A16 attached with the purge valve 6a, a block B17 for an upper block A17 attached with the mass flow controller 8a, and a block B18 for an upper block A18 attached with the output valve 10a. those blocks B constituting the three gas lines are close placed in the checker pattern without clearance therebetween.

The passage blocks B11 to B15, and B17 are the type shown in FIG. 10(b). The passage block B16 is the type shown in FIG. 19(b). The passage block B18 is the type shown in FIG. 12(b). Concretely, the passage blocks B are mounted as shown in FIG. 4.

As mentioned above, the blocks B11 to B18 constitute the process gas supply line a, the blocks B21 to B28 constitute the process gas supply line b, and the blocks B31 to B38 constitute the process gas supply line c.

The pressure gage 4a is connected, in FIG. 2, with the passage connecting the regulator 3 to the filer 7a. However, the passage diverges in the upper block A attached with the pressure gage 4a in the present embodiment and, formally, the outlet port of the regulator 3a is connected with the inlet port of the pressure gage 4a, and the outlet port of the pressure gage 4 is connected with the inlet port of the filter 7a.

The action of the base block C is explained below. Note that since the three process gas lines a, b, and c have the same structure, only the line "a" is described below.

In the line, as shown in FIG. 3, sequenced from the left are a base block C11 for the communication between the process gas supply source and the outlet port of the manual valve 1a, a base block C12 for the communication between the outlet port of the manual valve 1a and the inlet port of the regulator 3a, a base block C13 for the communication between the outlet port of the regulator 3a and the inlet port of the pressure gage 4a, a base block C14 for the communication between the outlet port of the pressure gage 4a and the inlet port of the filter 7a, a base block C15 for the communication between the outlet port of the filter 7a and the inlet port of the input valve 5a, a base block C16 for the communication between the outlet port of the input valve 5a and the inlet port of the purge valve 6a, a base block C17 for the communication between the outlet port of the purge valve 6a and the inlet port of the mass flow controller 8a, and a base block C18 for the communication between the outlet port of the mass flow controller 8a and the inlet port of the output valve 10a.

As mentioned above, the base blocks C11 to C18 constitute the process gas supply line a, the base blocks C21 to C28 constitute the process gas supply line b, and the base blocks C31 to C38 constitute the process gas supply line c.

Immediately underneath the passage blocks B16, B26, and B36 for the purge valves 6a, 6b, and 6c respectively, a purge block CA is mounted on the mounting panel D. This purge block CA is communicated with the passage blocks B16, B26, and B36 through the ports 41 shown in FIG. 19. Immediately underneath the passage blocks B18, B28, and B38 for the output valves 10a, 10b, and 10c respectively, an output block CB is mounted on the mounting panel D. This output block CB is communicated with the passage blocks B18, B28, and B38 through the ports 41 shown in FIG. 12.

Figure 30:
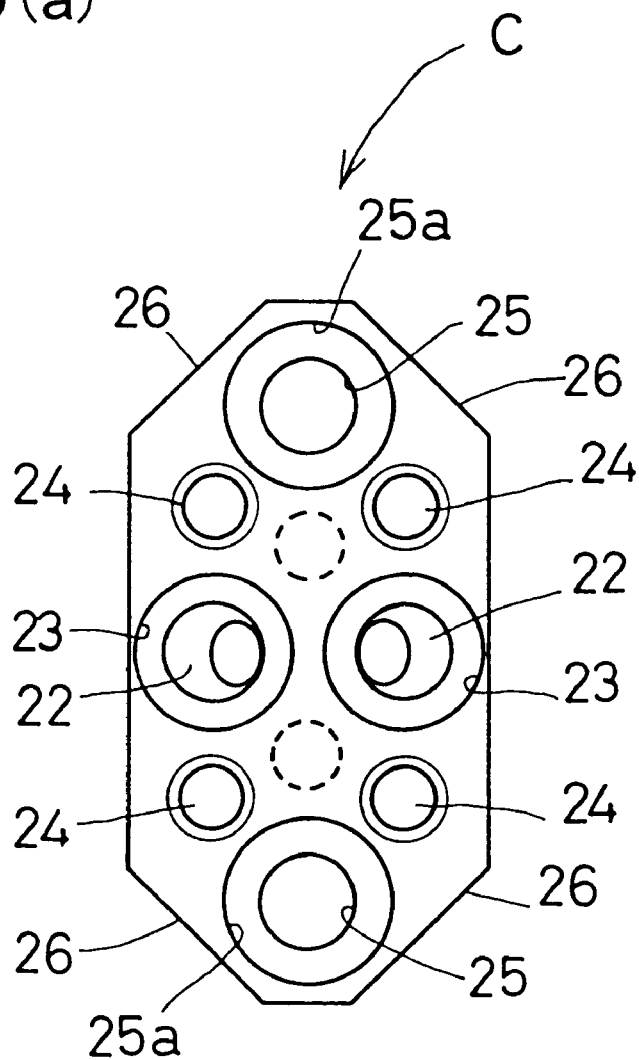
FIG. 30(a) is a plane view of the base block.
FIG. 30(b) is a sectional view of the base block.
Figure 30:
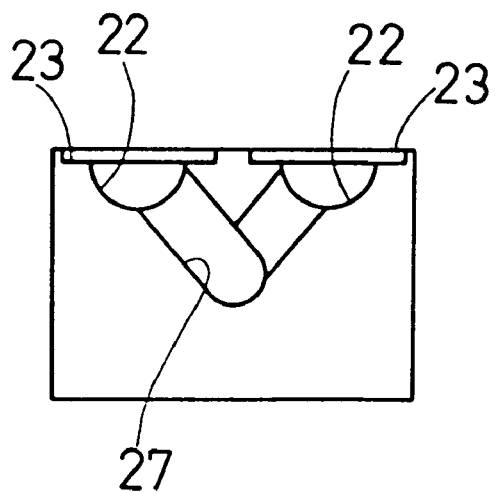
Figure 31:
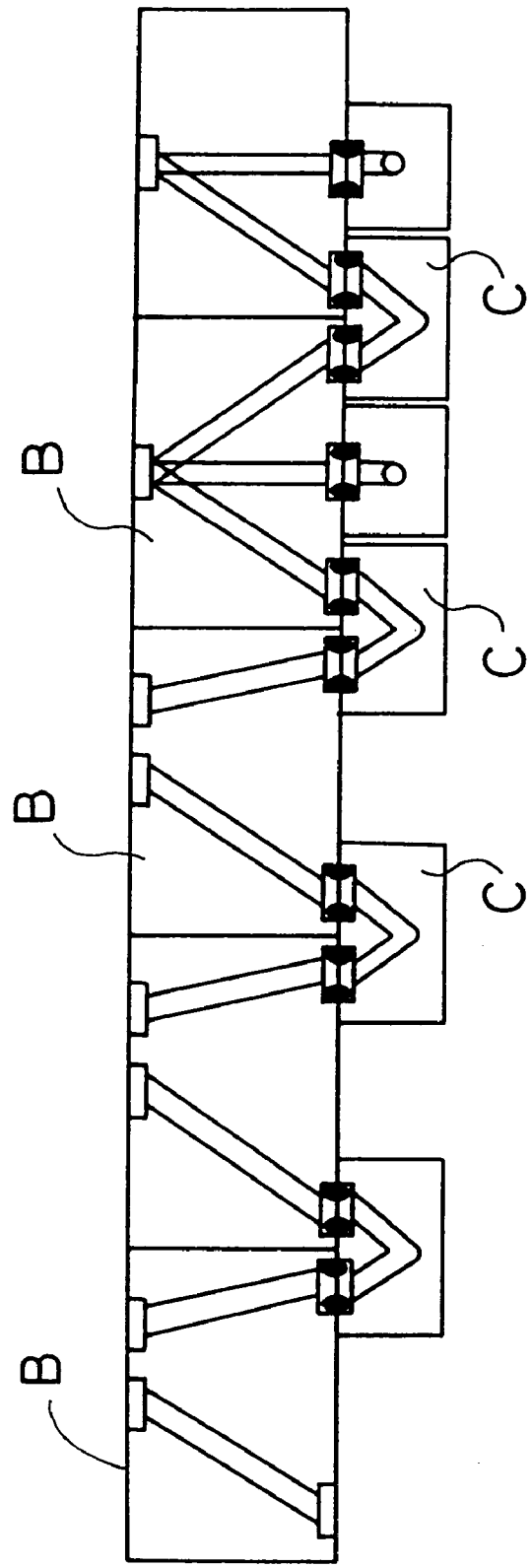
FIG. 31 is a sectional view of the passage constructing blocks and the base blocks assembled together.

The passage blocks B and the base blocks C including the purge block CA and the output block CB in a state where they are assembled are shown in FIG. 30 in a cross section.

The purge passage and the output passage are used in common for the lines. In the present embodiment, therefore, a long block is placed perpendicularly to the lines a, b, and c to provide the purge passage and the output passage. According to the present invention, the base blocks C may be combined to provide the purge and the output passages without using the purge block CA and the output block CB.

Figure 36:
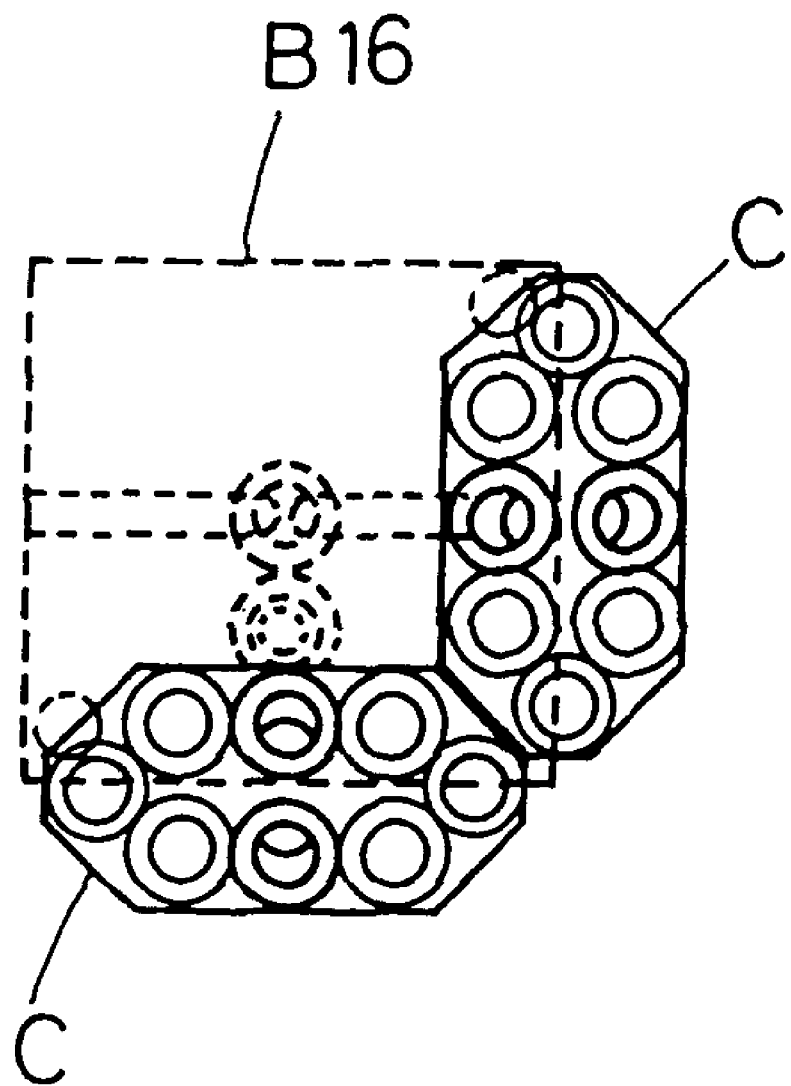
FIG. 36 is a schematic plane view of an example of the combination of the base blocks used for providing a purge or output passage.
Figure 37:
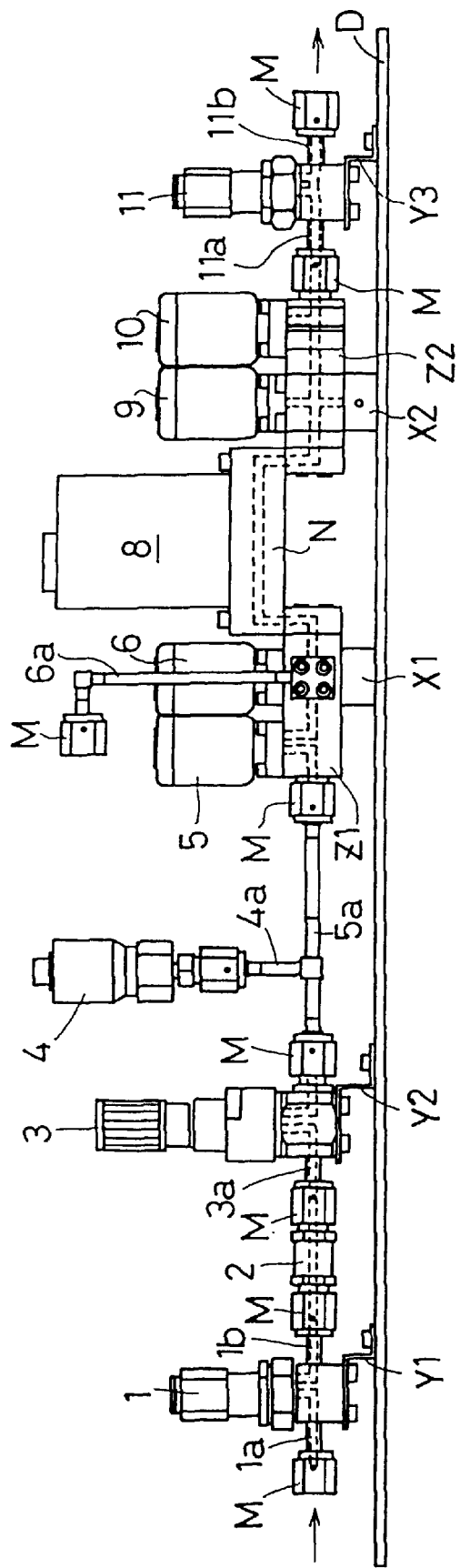
FIG. 37 is a structural view of a process gas supply unit in the prior art.
Figure 38:
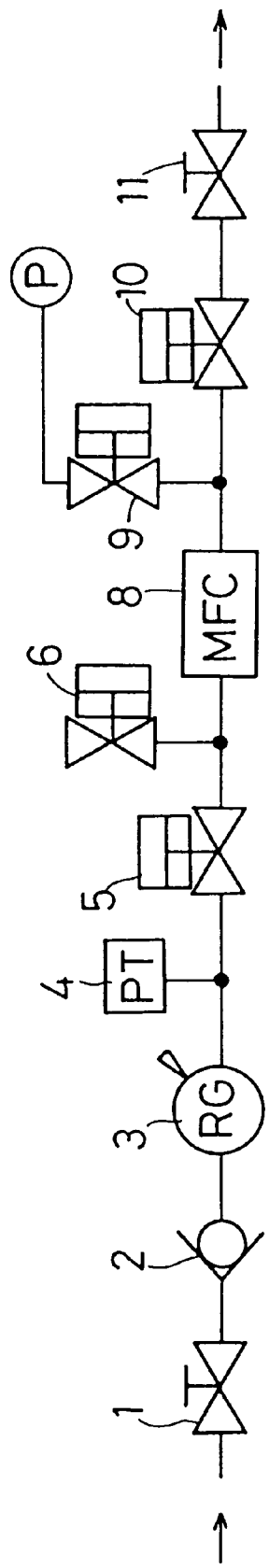
FIG. 38 is a circuit diagram of FIG. 37.

In this case, however, if the base block C is just a rectangular parallelepiped, the corners of the combined blocks C will interfere with each other. The base block C in the present embodiment is substantially a rectangular parallelepiped with the cutout portions 26 at the corners. Accordingly, the base blocks C can be close combined perpendicularly to each other as shown in FIG. 36. This can achieve the provision of all passages by the use of only the base blocks C.

As above, one example of the process gas supply unit according to the present invention has been explained with reference to FIGS. 1 to 4, and FIG. 35. By the optional combination of the upper blocks A, the passage blocks B, and the base blocks C, almost all the circuit needed for the process gas supply line can be materialized.

In the process gas supply unit in the present embodiment, as mentioned above, there are provided the upper block A attached with one component E used for process gas supply such as the manual valve 1, the regulator 3, the pressure gage 4, the filter 7, the input valve 5, the purge valve 6, the output valve 10, the passage block B mounted on the upper block A by bolts to provide passages between the components E, and the base block C mounted underneath the adjacent passage blocks B and provided with a connection passage which connects the passage formed in the passage blocks B. since the components E are all mounted on the passage blocks B through the upper blocks A without using pipes, the whole unit can be integrated and downsized. Due to no pipes, there is no possibility that particles generate in the pipes.

All blocks are down mounted by bolts from the same direction, i.e., from above. Specifically, the upper blocks A attached with the components E are mounted on the passage blocks B, the blocks are mounted on the base blocks C, and the blocks C are mounted on the mounting panel D. All of the components and blocks can be detached from or attached to the panel D without detaching the panel D from a machine or a wall even if the panel D is close attached thereto. It is to be noted that the unification of the diameter and length of all bolts to be used for mounting the blocks can eliminate the need for assorting bolts in particular in the detachment/attachment works, thereby enhancing the working efficiency.

The upper blocks A have an identical square bottom surface and include two or more types of different passage patterns. The passage blocks B have an identical square top and bottom surfaces to the bottom surface of the upper block A and include two or more types of different passage patterns. Such the upper blocks A and the passage blocks B are combined to the process gas supply unit in combination with optional components E. By the combination of the upper blocks A, the passage blocks B, ant the base blocks C, which are standardized products, and almost all the circuits can be rapidly materialized. Such the standardized products are supplied after particles are sufficiently removed in advance, so that the generation of particles in the semiconductor manufacturing can be reduced as compared with the prior art case that the blocks have to be used in the line right after passages are formed by machine tools.

The upper block A has a center port 19 formed in the center in the square bottom surface, the port 19 being to be communicated with the component E, the second port formed in the bottom surface at one place on one of four perpendicular lines from the center of the center port 19 to the four sides of the square surface respectively, and the third port formed in the bottom surface at one place on a different perpendicular line from that the second port is formed (for example, in a direction at right angles to the second port about the center port). Accordingly, the flexibility to construct a desired circuit can be increased.

Instead of the base block C, the passage block B may be provided with a connection passage having a V-shaped cross section for providing the communication between the components E. Since the third port is communicated with the first passage connecting the center port 19 to the component E attached on the upper block A, the passage block B can be formed with the connection passage of the same V-shaped cross section as that of the base block C without increasing the thickness of the base block B. In this case, consequently, the passage block B and the base block C can be made to be a common standard.

Figure 32:
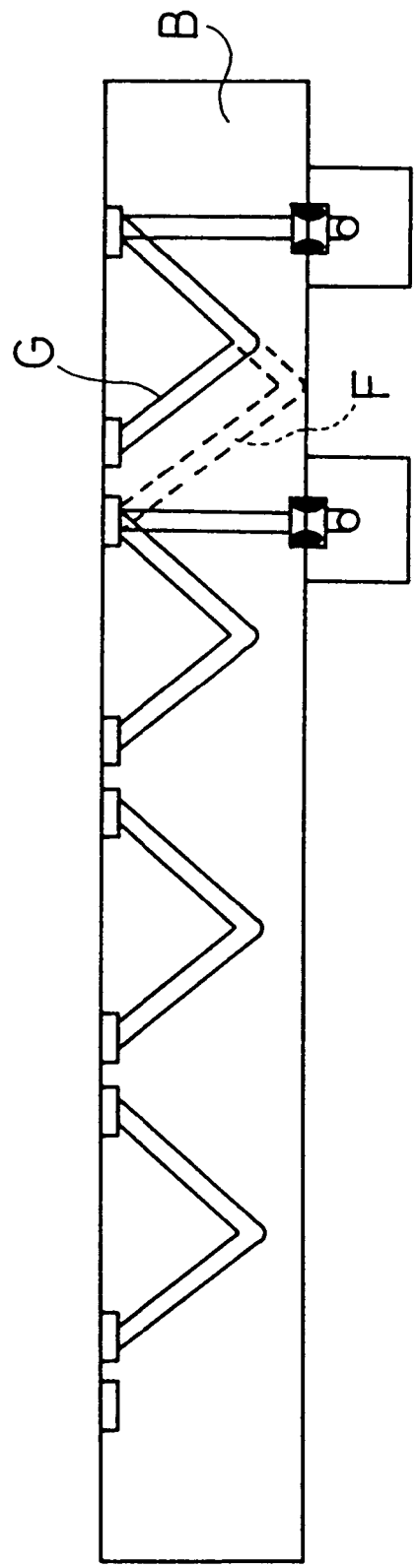
FIG. 32 is a sectional view of the passage constructing blocks of another type having a V-shaped passage.
Figure 33:
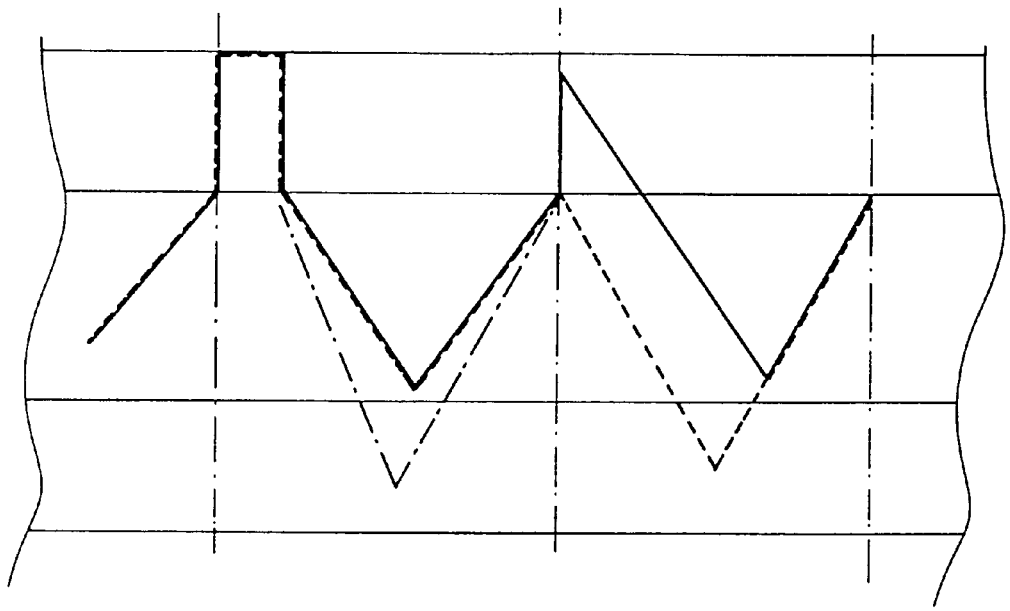
FIG. 33 is a schematic drawing of explaining the depth of the V-shaped passage of FIG. 32.

Specifically, as shown in FIG. 32, the connection passage has to be formed in the passage block B as indicated by a dotted line F if the third port is not formed to communicate with the first passage connecting with the center port 19. This needs the increase of thickness of the block B. On the other hand, the third outlet port is communicated with the first passage communicating with the center port 19 in the upper block A in the present embodiment, as shown in FIGS. 6 and 7, so that the connection passage can be formed in the passage block B, as indicated by the line G in FIG. 32, without increasing the thickness of the block B than those of the other types of the block B. This is diagrammatically expressed in FIG. 33.

Furthermore, the passage block B is provided with the first port formed in the center in the square top surface and communicated with the center port 19 of the upper block A, the second port formed in the top surface at one place on one of four perpendicular lines from the center of the first port to four sides of the square top surface and communicated with the second port of the upper block A, and the third port formed at one place on a different perpendicular line from that for the second port and communicated with the third port of the upper block A, and also the base block C is provided with the passage 27 having a V-shaped cross section. Accordingly, by the simple combination of the standardized products for the upper block A, the passage block B, and the base block C, almost all the circuits are materialized and therefore a desired circuit can be made rapidly. Those standardized products are supplied for the line after particles are sufficiently removed in advance, so that the generation of particles in the semiconductor manufacturing line can be reduced as compared with the prior art case that the blocks have to be used in the line right after the passages have been made in the blocks by machine tools.

The base block C is provided with the pair of communication holes 22 and 23 which are communicated with each other through the passage having a V-shaped cross section, the pair of mounting holes 25 formed perpendicular to the pair of the communication holes 22 and 23, for mounting the base block c on the mounting panel D, and the cutout portions 26 formed at the corners of the substantially rectangular parallelepiped. This configuration allows two base blocks C to close combine, so that the base block C can be attached in a direction perpendicularly to the series of the passage blocks B for a line.

Figure 34:
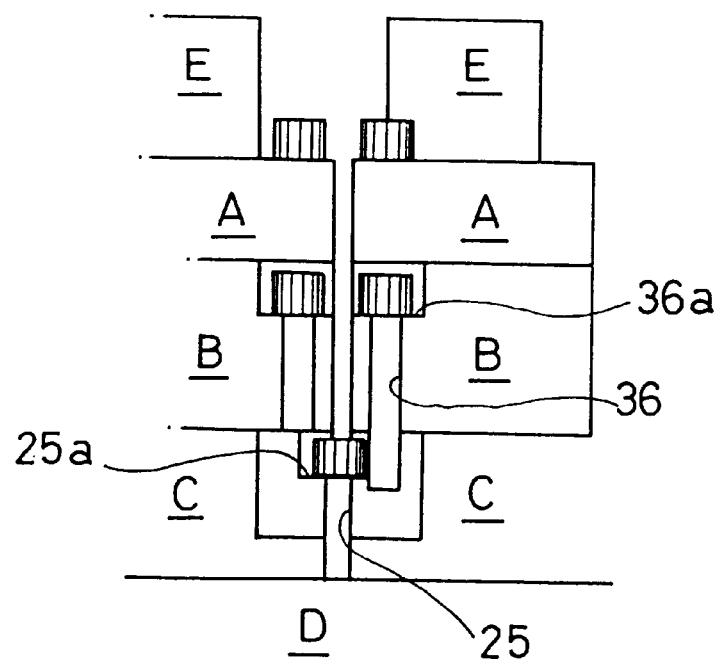
FIG. 34 is a schematic sectional view of main parts of the blocks assembled on the panel by bolts.

The base blocks C are mounted from the top on the mounting panel D by bolts. The passage blocks B are mounted from the top on the base blocks C by bolts. The upper blocks A attached with the components E are mounted from the top on the passage blocks B by bolts. The base block C has the counter bore 25a around the mounting hole 25 for mounting the block C on the panel D and the passage block B has the counter bore 36 around the mounting hole 35 for mounting the block B on the base block C. Accordingly, when the upper block A is fixed on the combined blocks B and C, the bolt heads for fixing the base block C to the panel D and the passage block B to the base block C are put in the counter bores 25a and 36 respectively such that they are invisible from above as shown in FIG. 34. Consequently, there is no possibility of detaching the blocks B and C by mistake from the panel D. Since bolt heads are hidden from view, a worker does not need to do an extra confirmation work, thus enhancing the working efficiency for maintenance.

The present invention may be embodied in other specific forms without departing from the spirit or essential characteristics thereof. For instance, the components E attached on the upper block A are exemplified as the mass flow controller, the supply valve, the purge valve, the vacuum valve, the check valve, the regulator, the filter. Other pneumatic devices may be used as needed, which provide the same effect as the above devices.

Furthermore, the base plate of the process gas supply unit of the present invention may be directly installed on a metal plate and the like constituting a wall without using the mounting panel 12.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A process gas supply unit including:
    an upper module block provided with flow passages, the block being attached with a component for supply of process gas;
    a passage constructing block provided with flow passages for providing communication between the components through the flow passages of the upper module block which is down mounted on the passage constructing block by bolts; and
    a base block provided with a connection passage for connecting the passages of the adjacent passage constructing blocks, the base block being mounted underneath the adjacent passage constructing blocks.

2. The process gas supply unit according to claim 1, wherein the upper module block comprises two or more types of which the flow passages differ in pattern, all of the types having a square bottom surface with identical dimensions,
    the passage constructing block comprises two or more types of which the flow passages differ in patter, all of the types having a square top and bottom surfaces with identical dimensions to the bottom surface of the upper module block, and
    the upper module block attached with the component is combined with the passage constructing block to constitute the process gas supply unit.

3. The process gas supply unit according to claim 2, wherein the upper module block includes:

a first port formed in a center in the square bottom surface of the block, the first port being communicated with the component through a first passage of the flow passages;

a second port formed in the square bottom surface at one place on one of four perpendicular lines from a center of the first port to four sides of the square surface;

a third port formed in the square bottom surface at one place on a different perpendicular line from that the second port is formed on.

4. The process gas supply unit according to claim 3, wherein the third port is communicated with the first passage in an interior of the upper module block.

5. The process gas supply unit according to claim 2, wherein the passage constructing block includes:

a first port formed in a center in the top surface, the first port being connected with the first port of the upper module block;

a second port formed in the top surface at one place on one of four perpendicular lines from a center of the first port to four sides of the square top surface, the second port being connected with the second port of the upper module block;

a third port formed in the top surface at one place on a different perpendicular line from that the second port is placed on, the third port being connected with the third port of the upper module block; and the first, second, and third ports being individually communicated with ports formed at predetermined locations in the bottom surface of the passage constructing block through the flow passages provided in the block.

6. The process gas supply unit according to claim 5, wherein the connection passage formed in the base block has a substantially V-shaped cross section and with both ends which open in a top surface of the base block.

7. The process gas supply unit according to claim 1, wherein the upper module block comprises two or more types of which the flow passages differ in pattern, all of the upper module block having a square bottom surface with identical dimensions, the passage constructing block is mounted underneath two or more upper module blocks and is provided with a connection passage which connects the flow passages of the adjacent upper module blocks.

8. The process gas supply unit according to claim 1, wherein the connection passage of the base block has a substantially V-shaped cross section, the base block has a substantially rectangular parallelepiped with a cutout portion at each corner, the base block is further provided with a pair of communication holes in a top surface, the communication holes being communicated through the connection passage, and a pair of mounting holes for mounting the base block on a mounting panel, the mounting holes being placed perpendicularly to the communication holes.

9. The process gas supply unit according to claim 1, wherein the base block is down mounted on mounting panel by bolts, the passage constructing block is down mounted on the base block by bolts, the upper module block attached thereon with the component is down mounted on the passage constructing block by bolts, the base block is provided with mounting holes for mounting the base block on the mounting panel and counter bores formed around the mounting holes, the passage constructing block is provided with mounting holes for mounting the passage constructing block on the base block and counter bores formed around the mounting holes, and heads of the bolts fixing the base block to the mounting panel and heads of the bolts fixing the passage constructing block to the base block are put in the counter bores respectively and hidden from view when the upper module block is mounted on the passage constructing block combined with the base block.

* * * * *